US008239185B2

(12) United States Patent
Johnson

(10) Patent No.: US 8,239,185 B2
(45) Date of Patent: Aug. 7, 2012

(54) METHOD AND SYSTEM FOR SITUATIONAL LANGUAGE TRANSLATION

(75) Inventor: Mat Martin King Johnson, Two Harbors, MN (US)

(73) Assignee: GeaCom, Inc., Duluth, MN (US)

(*) Notice: Subject to any disclaimer, the term of this patent is extended or adjusted under 35 U.S.C. 154(b) by 1187 days.

(21) Appl. No.: 12/009,229

(22) Filed: Jan. 17, 2008

(65) Prior Publication Data

US 2009/0186322 A1 Jul. 23, 2009

(51) Int. Cl.
*G06F 17/28* (2006.01)
(52) U.S. Cl. .............. 704/2; 704/4; 704/5; 704/8; 704/9
(58) Field of Classification Search .................. None
See application file for complete search history.

(56) References Cited

U.S. PATENT DOCUMENTS

| 2002/0032561 | A1 | 3/2002 | Ishikawa et al. | |
| 2003/0033312 | A1 | 2/2003 | Koizumi et al. | |
| 2003/0036911 | A1* | 2/2003 | Morin | 705/1 |
| 2003/0208352 | A1* | 11/2003 | Lee | 704/2 |
| 2007/0100637 | A1* | 5/2007 | McCune | 704/277 |
| 2007/0259325 | A1* | 11/2007 | Clapper | 434/350 |
| 2008/0270218 | A1* | 10/2008 | Scott et al. | 705/10 |

FOREIGN PATENT DOCUMENTS

| JP | 17107595 A | 4/2005 |
| KR | 1020060017340 A | 2/2006 |

OTHER PUBLICATIONS

"Notification of Transmittal of the International Search Report and the Written Opinion of the International Searching Authority, or the Declaration", Jul. 29, 2009.

* cited by examiner

*Primary Examiner* — Leonard Saint Cyr
(74) *Attorney, Agent, or Firm* — Westman, Champlin & Kelly, P.A.; Z. Peter Sawicki

(57) ABSTRACT

The present invention is a method and apparatus for facilitating an interview where the interviewer and interviewee speak different languages. An important application is to first responder situations during an emergency. The invention implements several improvements over the prior art. A method is provided whereby the interviewee who cannot read can nevertheless specify her language to the interviewer and system. Choices of topics about which the interviewer might want to communicate with the interviewee are ranked by associated probabilities or risks, thereby assisting the interviewer in selecting next steps in the interview and treatment process; the interviewer, nevertheless, retains the discretion to choose other options. Information communicated to the interviewee in detail can be presented to the interviewer in summary form, so that the interviewer can concentrate on higher priority matters. Ordinarily, the interviewer and interviewee wear headsets, but an interviewee headset that can be conveniently converted into speakers allows the interviewer to communicate in the interviewee language to third parties at the scene, such as family members. Other implementations allow the headset to serve as a hub for sensor (e.g., camera, audio recorder, thermometer) data collection, storage, and dissemination.

18 Claims, 24 Drawing Sheets

METHOD AND SYSTEM FOR SITUATIONAL LANGUAGE TRANSLATION

FIELD OF THE INVENTION

The present invention relates to language translation. More particularly, it relates to a method and apparatus for language translation whereby an interviewer can interview a subject who speaks a different language from the interviewer.

BACKGROUND OF THE INVENTION

There are many contexts in which an interviewer needs to elicit information from a human subject. The interviewer might be a service provider, or a consumer of services. The subject might be a client, a customer, a patient, or, indeed, a service provider. In the health care context, for example, an emergency medical technician might need to determine how to care for a sick or injured patient. The measures to be taken could depend upon measurements, observations, questioning of the patient, questioning of friends and family, and witnesses. In addition to asking questions, the interviewer might need to issue instructions associated with the interview or with the treatment process.

When the interviewer and the subject do not speak a common language, their ability to communicate will be severely limited. In the context of a medical emergency, this is particularly problematic because of the urgency for an appropriate remedial response. According to the National Virtual Translation Center (NVTC) of the United States Government (http://www.nvtc.gov/lotw/USlanguages.html), more than 300 languages are spoken in the United States today. Of course, the interviewer and interviewee might both be multilingual, but any system needs to deal with the common case where the interviewer and interviewee each speak a single language, and those languages are different. According to the NVTC, about 80 percent of United States residents speak only English. According to the 2000 U.S. Census, of about 168,065 residents nationally who speak Hmong, for example, about 28 percent speak English "not well" or "not at all." (http://www.mla.org/map_data_langlistmode=lang_tops)

Lee (U.S. Patent Application 2003/0208352 A1) describes prior art approaches to interviewer/interviewee translation, including: translation by the interviewer; translation by family and friends; ad hoc interpretation by third parties; translation by professionals; and use of foreign language phrase books. As an improvement over these prior art approaches, Lee teaches the use of a computer if the information to be translated is routine. Questions presented to the interviewee can be in yes/no or multiple-choice forms. The interviewee may also be expected to respond to some questions by typing a number into a field. As an alternative to a personal computer (PC), Lee suggests that the system might be implemented on a personal digital assistant (PDA). A particular embodiment of Lee's approach utilizes a docked tablet computer on a rotating turntable. The tablet computer includes a touch tablet with a graphical user interface shared by the interviewer and interviewee. Questions are transmitted to the interviewee by means of text printed on the computer screen and audio transmitted by speakers. Instructions may be issued to the interviewee in audio or printed form. The information collected is not stored in the translation device. As a preliminary task, the language of the interviewee must be identified. Lee presents a method wherein languages are presented for interviewee choice, each language represented as a national flag accompanied by the name of the language written in that language.

The choice of questions obviously depends on the purpose of the interview. In some limited circumstances, the series of questions might be linear; that is, questions can be asked without deviation from a specific known sequence. For example, once it has been determined that hospital services will be paid for with a credit card, the questions to be answered follow linearly; namely, credit card type, credit card number, verification code, name on the card, and expiration date. However, some branching in the line of questioning is necessary in most interviews. In the hospital payment example, the subject will typically be asked first what form of payment will be used. Depending on the answer—cash, check, or credit card—a branch in the line of questioning to a context-specific sequence of follow-up questions will be required.

Bhatnagar (U.S. Patent Application 2004/0054693) teaches navigation through a tree of choices to diagnose a problem and recommend a solution. Green (U.S. Pat. No. 6,701,322) describes navigation through a series of questions in which an interviewee's response to a given question determines, through the use of a branching table, the next question that will be asked.

SUMMARY OF THE INVENTION

The invention is a method and apparatus for conducting an interview in which the interviewer uses a first language and the interviewee uses a second language different from the first. Diagnosis and treatment by first responders, such as emergency health care providers, is an important application of the invention. Although most of our examples will deal with this application, the invention is not limited to this context.

The apparatus includes three digital electronic systems, namely, an interviewer system, an interviewee system, and a server system. In some embodiments, the three systems are disjoint, although there is communication among them; in other words, each system contains exclusively components distinct from those of the other systems. In other embodiments, some hardware or software components are shared between systems. In the extreme case, all three systems might be housed in a single device, such as a tablet PC. The systems can communicate information with each other by standard means, such as a personal area network (PAN) (e.g., one implemented with Bluetooth technology) local area network (LAN), wide area network (WAN), utilizing wired or wireless connections. However, communication between systems in some embodiments may be indirect; for example, all communication between the interviewee system and the server system might pass through the interviewer system.

The interviewee system includes an interviewee screen adapted to output in the form of images, graphical user interface elements, and text. The interviewee system also includes an input device for interaction with the interviewee screen and system. Such input could be by touch, pointing device (e.g., a mouse or a stylus), keyboard, or some combination thereof. The interviewer system also includes an interviewer screen and an input device, for interviewer input and output. Ordinarily, the interviewer screen will have the same general capabilities as the interviewee screen, although in some embodiments the interviewer screen has text input and output capability only, without the ability to display images. It will be recognized by those familiar with computers that the interviewer screen and interviewee screen might in some embodiments be combined into a single device; this might involve splitting the display into two halves, one for the interviewer and the other for the interviewee. Such combination is within the scope of the invention. Similarly, the interviewer input device and the interviewee input device might be the same, for example, where the interviewee and interviewer both interact by touch with a single tablet PC.

The invention includes logic that facilitates a variety of functions relating to the interview, including, for example: communication to the interviewer of information about a method for treating a patient or for using a new type of instrument; specification and storage of the language of the interviewee; presentation to the interviewer of choices to assist the interviewer in conducting the interview and issuing instructions; permitting the interviewer to enter information regarding the interviewee based upon the interviewer's own observations; allowing the interviewer to select a topic about which information is to be communicated to the interviewee, in the form of one or more questions, images, or instructions; communicating words to the interviewee in audio form or as text displayed on a screen; receiving input from the interviewee who uses the input capabilities of the interviewee system; and storing the questions asked, instructions given, and interviewee responses. The facilitating logic can be implemented in software or in digital electronic hardware, or some combination of the two. The actual device upon which the logic executes is unimportant for the invention so long as the necessary communications links among devices are present. For example, software might execute in the interviewer system, the interviewee system, or a remote sever that communicates with interviewer and interviewee screens across a wireless network; logic with the necessary functionality could be split across two or more systems.

The server system includes digital storage to hold topics, questions, instructions, and possible answers to yes/no and multiple-choice questions. Topics, summaries, questions and instructions are stored electronically in the language of the interviewer in text form. If a given implementation of the invention supports two interviewers who speak different languages from each other, then interviewer information will be stored in both languages. Questions and instructions are also stored in both text and audio recordings in a variety of languages for the purpose of expression to possible interviewees. As with the location of the software, the location of the storage is not critical to the invention. In one embodiment, all questions and answers are stored on a central server system and accessed by wireless communication across a wide area network. Centralizing the topics onto a server allows the content to be updated on a continuous basis and made available to all interviewer and interviewee systems in the field. On the other hand, some embodiments of the invention do not require a separate server, allowing the invention to operate in totally remote locations, without a network, server, or hospital. As will be described below, an aspect of the invention is a headset that can serve as a collection and storage hub for measurements such as temperature and blood pressure readings, and video and audio information.

The interviewee system has audio equipment for communicating with the interviewee, including a headset or a speaker. A microphone may also be included. The interviewer system has similar equipment for communicating with the interviewer, although preferably the interviewer will have a headset rather than a speaker. Of course, the audio equipment and any device transmitting an audio signal to that equipment must be connected with each other in a manner appropriate to carrying the signal, such as by wired or wireless connection.

In a typical embodiment of the invention, the interviewer will select a topic about which information is to be communicated to the interviewee. This topic will be sent to the server. The server will respond by sending to the interviewee system audio information, which will be communicated in the language of the interviewee through audio equipment that is part of the interviewee system. Information related to the topic might also be communicated in graphical or text form on the interviewee screen.

The interviewer might receive on his audio equipment, expressed in the interviewer language, some or all of the information being received by the interviewee. Preferably, when possible, the interviewer will receive from the server system only capsule summaries of detailed information being communicated to the interviewee. The capsule summaries are a distinguishing feature of the invention; they free the interviewer to concentrate on critical tasks other than communicating with the interviewee, such as observation, diagnosis, analysis, or treatment.

At any point in the interview process, given the information that has already been observed by the interviewer or elicited from the interviewee, which line of questioning or treatment the interviewer should pursue next might not be obvious. In such a situation, the invention will present the interviewer with options and give the interviewer discretion to choose from among them. To assist the interviewer, the options will be ranked in a list based upon the expected preference of each, from best to worst. Associated with a particular option might be an indication of strength of that option, such as a score from one to five stars. Some factors that might be included in determining the ranking include: (1) the probability that a given option is the correct; (2) the expected loss or damage that would occur if a given option is the correct one but is not selected; and (3) the expected loss or damage that would occur if a given option is selected, whether or not the option is correct. As an example of (3), consider a procedure that calls for a patient to undergo surgery, a treatment that carries some risk of harm, independent of the patient's other problems.

In some embodiments, the software will have access to records of the interviewee contained in storage, typically on the server system. The interviewer screen will provide the interviewer with access to certain records through GUI controls. Data contained in the stored records may also be taken into account in ranking options for questions, instructions, and treatment as described in the previous paragraph.

The apparatus will have the capability to record audio and video of the patient or the scene for inclusion in the records or for analysis and diagnosis in real time. Many computers and cell phones already have this functionality built in; the software will allow the interviewer to associate the audio clips, video clips, and still photographs with the interviewee and with an incident or session. Typically, this data will be stored in the server system or in a headset storage system as described below.

Particularly in health care contexts, information will sometimes be presented to the interviewee in three-dimensional form. The interviewee might be presented with a three dimensional image of a human body that can be rotated and touched to make selections. For example, a patient might be asked to answer the question, "Show me where it hurts", by manipulating a three dimensional image. The invention utilizes graphical choices whenever possible, minimizing or eliminating any use of questions that expect the interviewee to be able to read.

The software will include functionality to identify the language of the interviewee by GUI presentation on the interviewee screen. The interviewee will be presented with a map at coarse resolution, typically a world map. Touching an area of the map will bring up a new map at higher resolution. Successive touches will bring up successively higher resolutions until the interviewee is able to point to a country or region, whereby his or her language can be identified by logic implemented in hardware or software. As mentioned previously, in all respects the invention minimizes the need for the interviewee to be able to read.

In some embodiments, multiple interviewers speaking different languages might need to work with a single interviewee. In some embodiments of the invention, each interviewer will have their own interviewer screen. The software will cause each interviewer to see on their screen questions and instructions issued by the other interviewers in that interviewer's own preferred language. The interviewer screens will be linked by wireless technology such as a Bluetooth PAN.

In some embodiments of the invention, there are two interviewee systems, each interviewee speaking a different language from the other. Each interviewee language would have to be separately determined, possibly with the method already described that uses successively refined maps on a graphics screen. A topic selected by the interviewer would result in information having the same meaning being transmitted to each interviewee system, in the appropriate respective language. Separate audio equipment for each interviewee would be required.

In some situations, the interviewer may want two or more people to hear the questions and instructions directed toward the interviewee. For example, a friend or family member might be present who speaks the same language as the interviewee. This other person might be able to assist the interviewee in answering the questions, or might know information about the interviewee that the interviewee herself does not know. For example, the interviewee might be a child and the other person, a parent.

To address this situation, some embodiments of the invention include a new type of interviewee headset. The headset includes one or two ear cups and a headband. The headset has two configurations. In its head-mount configuration the ear cups are adapted to transmitting audio information to the ears of just one individual. In its broadcast configuration, the headset is adapted to broadcasting audio information through the ear cups to a plurality of people. To change between the two configurations, a user performs a mechanical transformation that includes a rotation or pivoting. The transformation automatically adjusts the maximum sound amplitude available so that the maximum will be louder in the broadcast configuration than in the head-mount configuration.

As in many prior art headsets, the ear cup includes a rigid outer shell and a soft foam earmuff adapted to sealing to the head of the wearer and preventing external sound from reaching the wearer's ear.

In some embodiments, the headband has a forehead section and a nape section. Each of these two sections has an arch shape pivotally attached at the base or tines of the arch to the ear cups. (It will be assumed here for purposes of discussion that the headset has two ear cups, although a headset with only one ear cup behaves analogously is within the scope of the invention.) When the headband is in the head-mount configuration, it is substantially elliptical in shape. The pivotal attachment allows one of the arches to be folded toward the other. Each arch lies essentially in a plane. In the broadcast position, the planes of these two arches are substantially parallel to each other. By "substantially parallel" is meant that the planes of the two arches intersect at an angle less than 45 degrees. Preferably the planes of the arches intersect at an angle less than 20 degrees. In some embodiments, the planes of the arches are actually parallel or within 5 degrees of being parallel. In any case, therefore, in the broadcast position, the two arches effectively fold into a single arch, with the two ear cups at the base of the arch, one on each tine of the arch. In the broadcast configuration, each ear cup is pivotally attached to its respective tine, allowing it to rotate into a position where the transmission direction of the ear cup is in substantially the same direction as the collapsed arch opens. In the resulting broadcast configuration, the headset can rest on a surface such as a table top, supported upon the single arch of the folded headbands and possibly also the speakers.

In some embodiments, the headband automatically adjusts to fit the head size of the user. In some such embodiments, the headband includes interlocking segments. The headset expands when the interlocking segments as the segments are pulled gradually apart. In some embodiments, an elastic band or cord is threaded through the segments connecting pairs of adjacent segments together. The elastic connector stretches to create a force that opposes stretching. The elastic therefore keeps the segments in position so that the headband always fits the head of the wearer snugly.

The headset includes a power switch having on and off positions. Typically, the headset also includes a power indicator to show whether the power is on. The indicator might be a lamp or an LED. Typically, the power switch will be built into an ear cup, but it might alternatively be included in the headband.

In some embodiments, the headset includes a battery to power its functionality. In such embodiments, there may be a battery level indicator adapted to showing when the battery is low. This might be combined with the power indicator, for example by different colored light to indicate whether the battery level is acceptable or running low. Typically, the battery will be rechargeable. The headset might include a power cord to provide electricity to the headset or to recharge the battery.

In some embodiments, the headset includes a mute switch for turning off and on electronic transmission of sound to the speakers. In some embodiments, muting the sound removes a barrier to sound entering the ear cups, for example by also opening a channel or an orifice in one or both of the ear cups. When muting is disabled, then the channel or orifice closes. Partical in a medical service context, the interviewer might choose to hear ambient sound without removing the headset.

In some embodiments, the headset includes a storage system. The storage system includes a storage device, such as a hard disk drive, volatile or nonvolatile memory, or a tape drive, and a controller facilitating read access or write access to the storage device. The storage system acts as a data or file server for one or more systems external to the headset. The interviewer system, the interviewee system, the server system, and various measurement devices (e.g., medical instruments, audio and video recorders) might access the headset storage system for read or write access.

In some embodiments, the headset includes one or more processors adapted to executing software. Each processor could be used in the implementation of one or more of the functions of the headset.

The headset contains one or more wireless communication components adapted to communicating with external devices. For example, a WAN interface might be included for communication with a remote storage server. A LAN interface might be included to communicate with in-house systems within a business environment. A PAN interface might be included for security or privacy reasons or where electromagnetic radiation is a form of pollution, such as in a hospital or on an airplane. Bluetooth technology has the advantage that its range can be kept to approximately 7 meters radius.

In some embodiments, the headset includes an expansion slot configured to provide communication between the headset and an device inserted into the slot. The device might be a hard disk, a head lamp, or some sensor such as a thermometer, a camera, or an audio recorder. The expansion slot can also be used to provide power to the device. A variety of technologies might be used to implement the expansion slot; one example is USB 2. Some expansions slots might be configured with a power switch to control whether a device attached to that slot is powered on or off. An expansion slot might also be configured with other components to control the behavior of the apparatus attached to the expansion slot.

In some embodiments, the headset includes a pluggable component bus adapted to securing a plurality of pluggable components to the headset, the bus allowing communication between the headset and the external device. The geometry of the bus can be configured to permit attachment of the pluggable devices only in a preferred or correct orientation. In some embodiments, the pluggable components are secured magnetically to the bus. Often, the bus will be used by a user to plug in device control interface components, used to communicate with external devices. Such a component might allow communication between the headset and, for example, a camera, a thermometer, or an audio device. Logic implemented in software or electronic hardware in the headset provides communication between the slot and the external device. The logic may provide control by the headset of the external device, or to communicate information with the external device. Conversely, the external device may use logic in the headset to access data in storage on the headset. Since the headset will be typically in communication with the interviewer system, that system will be able to communicate with the external device, to control functions of the external device, to access data from the external device, or to be controlled by the external device. The bus typically receives power from the battery or other power source to which it is connected, including conceivably a pluggable component.

The headset in some embodiments will include a wireless server facilitating communication between logic of the headset and a wide area network or a local area network. The wireless server is also adapted to serving as a conduit between the interviewer system, the interviewee system, or the storage system to the local or wide area network.

DETAILED DESCRIPTION OF THE INVENTION

The following description and drawings referenced therein give illustrative embodiments of the invention. They are not intended to limit the scope of the invention. Practitioners in the art will recognize that many other embodiments of the inventive concepts are possible. All such embodiments should be considered within the scope of the invention.

Apparatus

Figure 1:
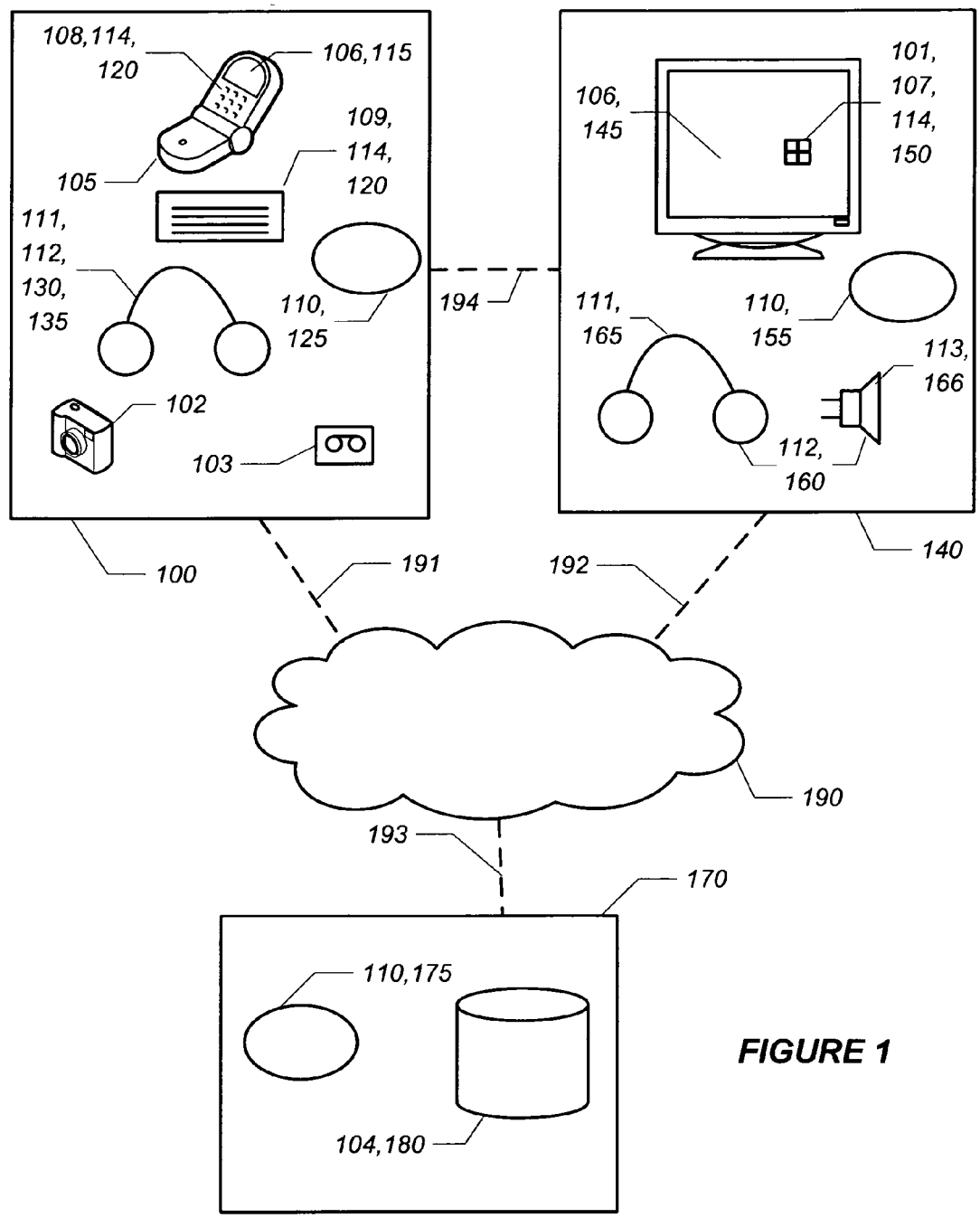
FIG. 1 is a schematic diagram illustrating an embodiment of the interviewer, interviewee, and server systems of the invention apparatus.

FIG. 1 depicts an embodiment of the apparatus of the invention. This embodiment includes an interviewer digital electronic system 100, an interviewee digital electronic system 140, a server system 170, a communication network 190, and communications links 191-194 connecting the three systems. All of the systems can be bundled into a single component of electronic hardware, or a single system can include two or more associated individual hardware components. The functionality of the hardware and associated software are important to the invention; the details of how that functionality is split among individual components are unimportant. Within a given system, all components can communicate with each other as necessary to perform their respective roles; such communication can be implemented in hardware, such as by wire or communication bus, or by some wireless mechanism. Certain communications links may not be present in all embodiments. Some components might be shared between the interviewer system 100 and the interviewee system 140. For example, these two systems might share a single graphical display or device for input of information. Similarly, the server system 170 plays the role of a storage or database server. Storage server functionality could be housed within components in common with the interviewer system 100 or with the interviewee system 140. Even when components are shared between two systems, because the functionality of each system is distinct, we still regard them as individual systems in this description and in the claims of this document.

Each of the three systems includes logic 110—interviewer system logic 125, interviewee system logic 155, and server system logic 175, respectively—to control their functionality and internal and external communications. Such logic 110 can be embodied in electronic hardware, software, or some combination thereof. The capability to run computer software is now found routinely in personal computers, personal digital assistants, mobile phones, and portable music players. The logic 110 may be entirely separate within each system, or may be partly or wholly shared among the systems. For example, a single software application might control the language translation functionality of the interviewer system 100 and the server system 170.

The interviewer system 100 and the server system 170 include a graphics screen 106, an interviewer graphics screen 115 and an interviewee graphics screen 145, respectively. A graphics screen 106 is adapted to displaying text, a graphical user interface (GUI), digital images in two dimensions, and digital images in three dimensions as projected onto a two dimensional surface. The GUI is adapted to receiving user input through virtual controls 101 displayed on the screen 106. Such controls, which are well known in the art, might include buttons, radio boxes, lists, or text boxes. A given GUI might utilize some or all of these types of controls, and possibly others. The GUI can provide the ability to point at and manipulate virtual objects displayed graphically in two or three dimensions. The GUI is under control of the logic 110 of the respective system. The interviewer graphics screen 115 and the interviewee graphics screen 145 could be housed in a single hardware component, or they could be separate. In embodiment illustrated in the figure, the interviewer graphics screen 115 is housed in a mobile phone 105. The interviewee graphics screen 145 is a touch screen 107 of a personal computer.

The interviewer system 100 and the server system 170 also each include hardware or tangible input controls 114—interviewer input controls 120 and interviewee input controls 150, respectively—for interacting with their respective systems, and in particular, through GUIs on their graphics screens 106. These controls, managed by logic 110 of the respective system, could be implemented in many ways known in the art. In FIG. 1, for example, the interviewer can interact with the interviewer graphics screen 115 through buttons 108 on the mobile phone 105 or through a keyboard 109. Again, many possibilities exist for such input controls 114 within the scope of the invention, such as a mouse, a trackball, and a scroll wheel. If a graphics screens 106 is a touch screen 107, then input to the GUI can be done with the touch of a finger or stylus.

The interviewer system 100 and interviewee system 140 may also include sound communication equipment 112 (interviewer sound equipment 130 and interviewee sound equipment 160, respectively) such as a headset 111 or a speaker 113. Such equipment is adapted to sending information in audio form to a user. The sound communication equipment 112 might also include a microphone (not shown) to allow a user to transmit audio information to the respective system, either for recording or for communication with another user. A microphone is often included off-the-shelf in a headset 111 or in a portable computer.

Ordinarily, information will be sent through interviewee sound communication equipment 160 to an interviewee in the language of the interviewee. The interviewee sound communication equipment 160 illustrated by FIG. 1 includes an interviewee headset 165 and an interviewee speaker 166.

Similarly, information will be sent through interviewer sound communication equipment 130 to an interviewer in the language of the interviewer. The interviewer sound communication equipment 130 illustrated by FIG. 1 includes an interviewer headset 135.

The interviewer system 100 might include a camera 102 adapted to recording and transmitting information about the interviewee and scene. The camera 102 might be capable of taking still shots or video clips, or both. The interviewer system 100 might also include an audio recording device 103, adapted to capturing what is said by the interviewee or other people who are present. The interviewer system 100 has the capability to send such captured visual and audio information to the server system 170 for recording in association with the patient and the incident. The interviewer system can include other sensors such as thermometers and blood pressure monitors, and equipment requiring power such as lamps and medical instruments for diagnosis or treatment.

In addition to server system logic 175, the server system 170 includes server electronic storage 180. Electronic storage, whenever it is referred to in the description or claims of this document, can be any mechanism for retaining information in digital electronic form, such as computer memory, hard disk, flash memory, compact disk, digital video disk, or magnetic tape. Electronic storage might be contained in a single housing, or it might be spread over a variety of computer and data storage systems. Within the scope of the invention, the server electronic storage 180 might actually be housed within the interviewer system 100 or the interviewee system 140.

For illustration, FIG. 1 shows separate communications links 191-194 between all three systems. In fact, although some communication is required between each pair of systems, such communication may not be direct. For example, all communication between the interviewee system 140 and the server system 170 might pass through the interviewer system 100. In the figure, communication from the interviewer system 100 and interviewee system 140 is shown as occurring through a network. This could be a PAN, a LAN, or a WAN such as the Internet.

In some embodiments, the interviewer system logic 125 is adapted to obtaining a choice of an interviewer language. The interviewer language might be selected by the interviewer through a GUI on the interviewer graphics screen 115. The choice of the interviewer language might be received from electronic storage 104, either local storage 104 within the interviewer system 100 or remote storage 104 within the server system 170. For example, the name of the interviewer might be used to retrieve a preferred language from storage 104. In other embodiments, the interviewer language might be assumed to be some particular language, such as U.S. English; in such embodiments, the step of obtaining a choice of interviewer language can be omitted.

The apparatus includes logic 110 adapted to causing a choice of an interviewee language, distinct from the interviewer language, to be saved to electronic storage 104. In some embodiments, interviewer system logic 125 receives the choice of interviewee language input through a GUI of the interviewer graphics screen 115 by the interviewer. In other embodiments, server system logic 175 either receives the choice of the interviewee language input through a GUI of the interviewee graphics screen 145, or receives input on the interviewee graphics screen 145 from which the language might be determined. In the subsection of this description entitled *Choosing a Language by the Interviewee*, a method is described whereby an interviewee can pick a region on a map, from which a language can be determined by association with the region. When the interviewee language is obtained by input through a GUI on the interviewer graphics screen 115 or the interviewee graphics screen 145, it will be saved to electronic storage 104; the storage 104 to which the choice of interviewee language is saved might be part any of the three systems. In some embodiments, the interviewee language might be obtained from electronic storage 104 rather than input through a GUI, for example, by association of information identifying the interviewee (e.g., a driver's license) with records previously saved in the server electronic storage 180.

In some embodiments of the invention, the interviewer system 100 includes logic 110 adapted to presenting, on the interviewer graphics screen 115, a ranked list of topics, the topics being presented in the interviewer language, the ranking being determined at least in part upon a respective probability associated with each topic. For example, in the context of emergency health care, the topics might be alternative lines of questioning that might be asked of a patient interviewee. Each line of questioning might be associated with a different candidate diagnosis of the patient's condition. For example, an emergency service provider might find a patient on the ground. This might be due to a heart attack, a stroke, a slip and fall accident, a broken bone, or other causes. Each possible cause could be a separate topic. A topic might be associated with a single question, a single instruction, or a sequence of questions or instructions to be delivered to the interviewee.

Which list of topics is presented at any given point in the interview might be influenced by a variety of factors. For example, in the context of emergency medical care, the factors influencing the content of a list of topics could include discretion of the interviewer, input from the interviewee in response to earlier questioning, observations by the interviewer of the situation, measurements taken by various kinds of instruments, comments from friends or relatives of the interviewee or of witnesses, and historical records of the interviewee. Historical records of the interviewee may be available through the server system 170 from the server electronic storage 180. The historical records can include a "session" that tracks a patient through an incident from first response until final resolution. As discussed below, an aspect of the invention is a headset that, in some embodiments, is adapted to serving as a hub for sensing equipment and data storage.

A distinguishing aspect of the invention is that the list of topics is ranked, with the ranking determined, at least in part, upon a respective probability associated with each topic. For example, if the topics are possible causes of a patient's condition, then the topics might be ranked by the probability, estimated from statistics about the public and information known through this point in the interview process about the patient, of each cause. However, the probability of each cause might not be the only factor taken into account in some embodiments. For example, the expected loss of not treating for a particular cause, listed as a topic, when that cause is the true cause of a problem, might also be used in determining the ranking of that cause. Expected loss due to incorrectly treating for some candidate cause, when that candidate is not the true cause, might also be incorporated into the ranking. In typical embodiments of the invention, this ranking will be performed by server system logic 175, possibly utilizing information sent to the server over a communications link from the interviewer system 100 or the interviewee system 140. The analysis of what to ask or how to treat the interviewee, or how to instruct the interviewer with respect to treatment and techniques, might require sophisticated statistical modeling techniques and artificial intelligence impossible to implement without computer technology.

In some embodiments, the interviewer system logic 125 is adapted to receiving a topic selection from the ranked list. The topic selection will ordinarily be received through the GUI on the interviewer graphics screen 115. It is important that the interviewer has discretion to choose either the most highly ranked topic or one with a lower ranking.

To respond to a choice of a topic, some embodiments of the apparatus contain logic 110 adapted to (i) receiving a first information item and a second information item associated with the topic selection; (ii) transmitting the first information item in audio form in the interviewee language using the interviewee sound communication equipment 160; and (iii) presenting the second information item in visual form using the interviewee graphics screen 145. For example, in the emergency medical treatment context, the first information could be a request to the interviewee to point to the screen, selecting the part of her body that hurts. The second information item could be an image of the human body to allow her to respond to the question by touching an appropriate point on the interviewee graphics screen 145.

Some embodiments of the invention include server system logic 175 adapted to receiving a topic, associating a first information and a second information with the topic, transmitting the first information in the language of the interviewee, and transmitting the second information in the language of the interviewer. In some of these embodiments, the first information item and the second information item will have the same meaning. In others, they will have different means; in one particular case of this, the second information item will be a summary of the first information item.

Ranking Topics for the Interviewer

Figure 2:
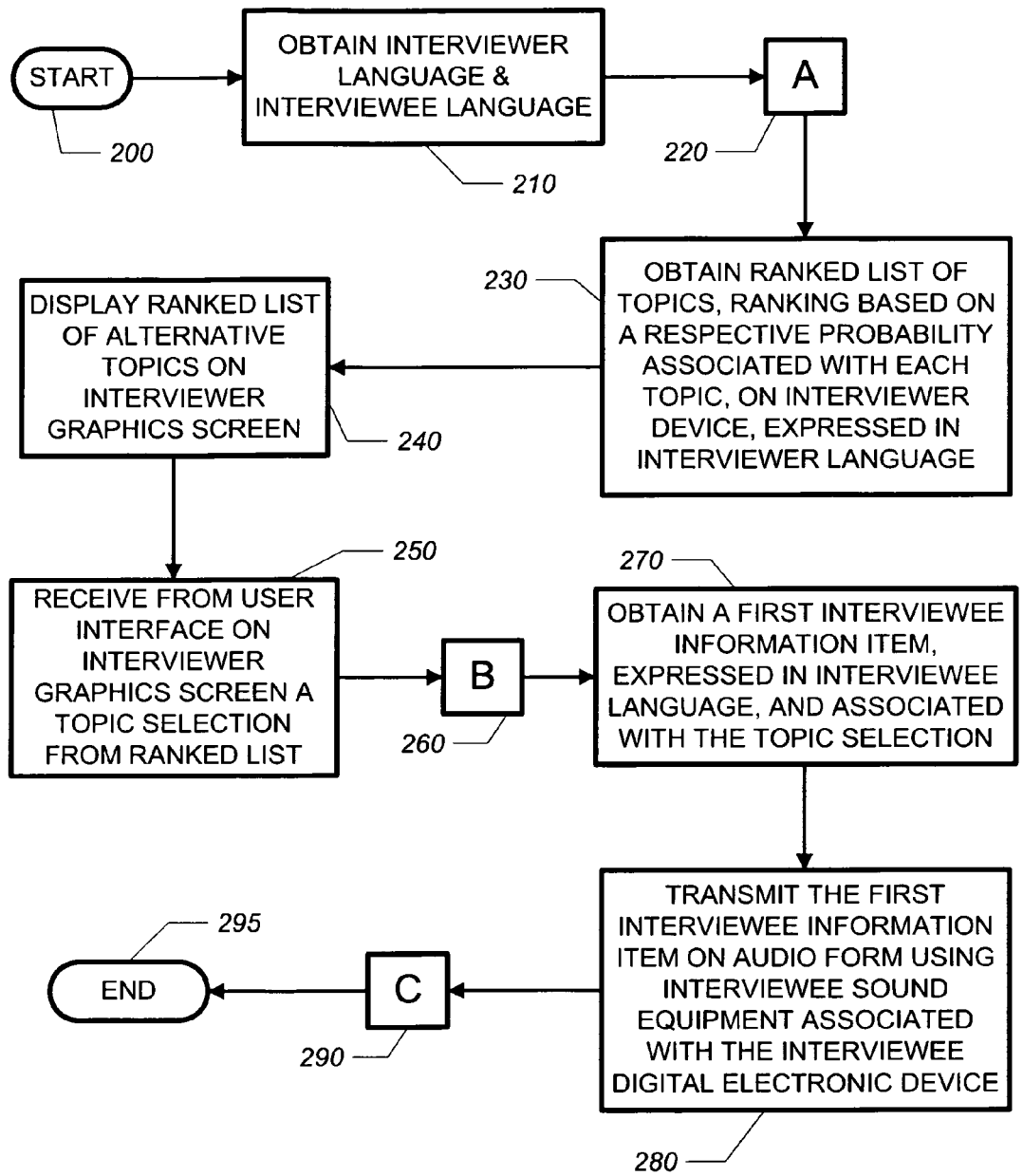
FIG. 2 is a flowchart illustrating an embodiment the invention including ranking of topics offered to an interviewer based in part upon associated probabilities.

FIG. 2 is a flowchart illustrating an embodiment of the invention in which the interviewer selects a topic from a ranked list in the interviewer's language, thereby causing audio information to be communicated to the interviewee in the interviewee's language. After the start 200 of the method, a choice of an interviewer language and a choice of an interviewee language are obtained 210 by logic in digital form. As described previously, the two language choices could be obtained in a variety of ways. For example, the interviewer might choose his language through a GUI on an interviewer graphics screen 115. The interviewee might choose her language through a GUI on an interviewee graphics screen 145, either directly or by a procedure such as the one described in the subsection below entitled *Choosing a Language by the Interviewee*.

The step 220 in the flowchart designated "A" represents several options at this point in the method. In some embodiments, "A" is a null step and is simply ignored. In some embodiments, "A" includes a step of creating a ranked list of topics. Ordinarily, the step of creating a rank list will be performed by server system logic 175 and may utilize information stored in the server electronic storage 180. In some embodiments, however, creating the ranked list occurs in the interviewer system 100.

In step 230, a ranked list, expressed in the language of the interviewer, is obtained by the interviewer system 100. In some embodiments, the ranked list is obtained by receiving it across a network from a server. If the ranked list is created locally within the interviewer system 100, on the other hand, the ranked list is obtained from the result of the creation step. The ranking is determined at least in part by a respective probability of each topic. How the ranking might be performed has been discussed previously in connection with FIG. 1. In some embodiments, also as discussed previously, the ranking is further determined by an expected loss associated with each topic. In some embodiments, the respective probability associated with each topic is determined at least in part upon information stored in a database regarding the interviewee. Typically, the database will be saved in the server electronic storage 180. In the medical response example, the database could include identification, demographic, and medical records regarding the interviewee. The records might include information collected or measured earlier in the current interview.

The ranked list is then displayed 240 on the interviewer graphics screen 115. A topic selection is received 250 by logic in the interviewer system 100. Ordinarily, the interviewer will make this selection from the ranked list of topics through the GUI on the interviewer graphics screen 115.

In some embodiments, step 260 in the flowchart designated "B" is a null step and is simply ignored. In other embodiments, "B" represents the step of transmitting the topic selection electronically across a network, ordinarily to the server system 170.

A first interviewee information item, associated with the topic selection and expressed in the interviewee language, is obtained. Typically, this information item will have been received across a network, usually from the server system 170. The first interviewee information item is then transmitted 280 using interviewee sound equipment 160 associated with the interviewee system 140.

In some embodiments, step 290 in the flowchart designated "C" is a null step and is simply ignored. In other embodiments, "C" represents the step of receiving by the interviewer system 100, from a network, an interviewer information item, said interviewer information item being expressed in the interviewer language and being associated with the topic selection; and the step of transmitting the interviewer information item by the interviewer system 100 in audio form using interviewer sound equipment 130. The interviewer information item may or may not be distinct in meaning from the first interviewee information item.

In yet other embodiments, "C" represents the step of receiving, by the interviewee system 140, from a network a second interviewee information item, said second interviewee information item being associated with the topic selection; and the step of displaying the second interviewee information item on an interviewee graphics screen 145 that is included in the interviewee system 140. The interviewee graphics screen 145 and the interviewer graphics screen 115 may or may not be included in the same hardware device. In some such embodiments, displaying the second interview information item includes displaying a three dimensional object on the interviewee graphics screen 145 in a first configuration, and "C" includes the additional steps of obtaining an interviewee signal from an interviewee graphics screen 145; using logic on the interviewee system 140, causing information relating to the interviewee signal to be sent to electronic storage; and using logic on the interviewee system 140, displaying the three dimensional object in a translated or a rotated form relative to the first configuration.

The method ends at step 295.

Summarizing Information for the Interviewer

Figure 3:
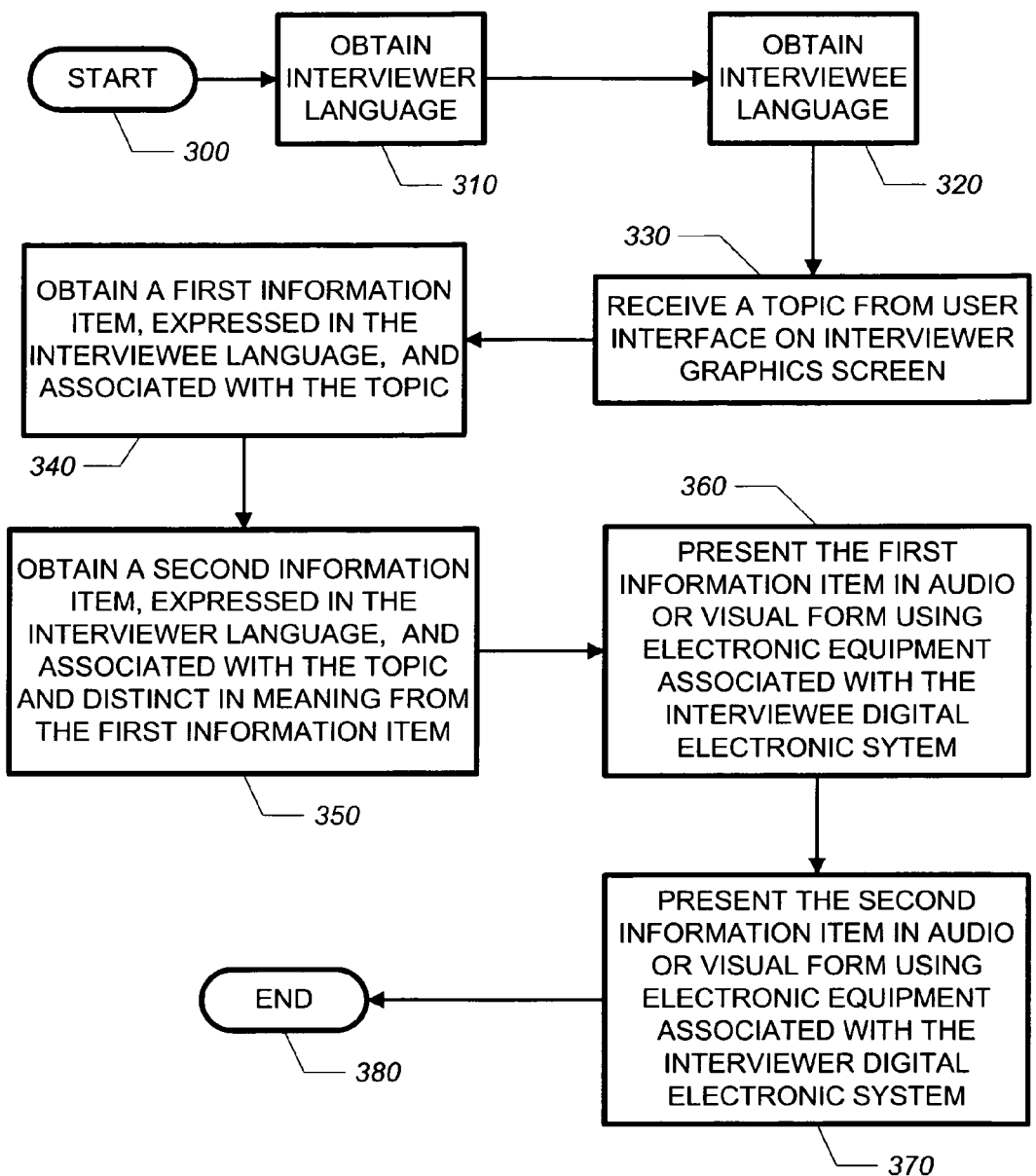
FIG. 3 is a flowchart illustrating an embodiment of the invention in which the interviewer receives only a summary of an information item sent to the interviewee.

FIG. 3 is a flowchart illustrating an embodiment of the invention in which the interviewer receives only a summary of an information item sent to the interviewee. After the start 300 of the method, an interviewer language is obtained 310 by logic and an interviewee language is obtained 320 by logic. A topic is obtained 330 from a user interface on an interviewer graphics screen 115. A first information item associated with the topic is obtained 340, expressed in the language of the interviewee. A second information item associated with the topic is obtained 350, expressed in the language of the interviewer. In the illustrated embodiment, the second information item is distinct in meaning from the first information item; in particular, the meaning of the second information item could be a summary of the meaning of the first information item. In other embodiments, the first and second information items have the same meaning. The first information item is presented 360 in audio or visual form using interviewee sound equipment 160 associated with the interviewee system 140. The second information item is presented 370 in audio or visual form using interviewer sound equipment 130 associated with the interviewer system 100. The method ends 380.

Choosing a Language by the Interviewee

Figure 4:
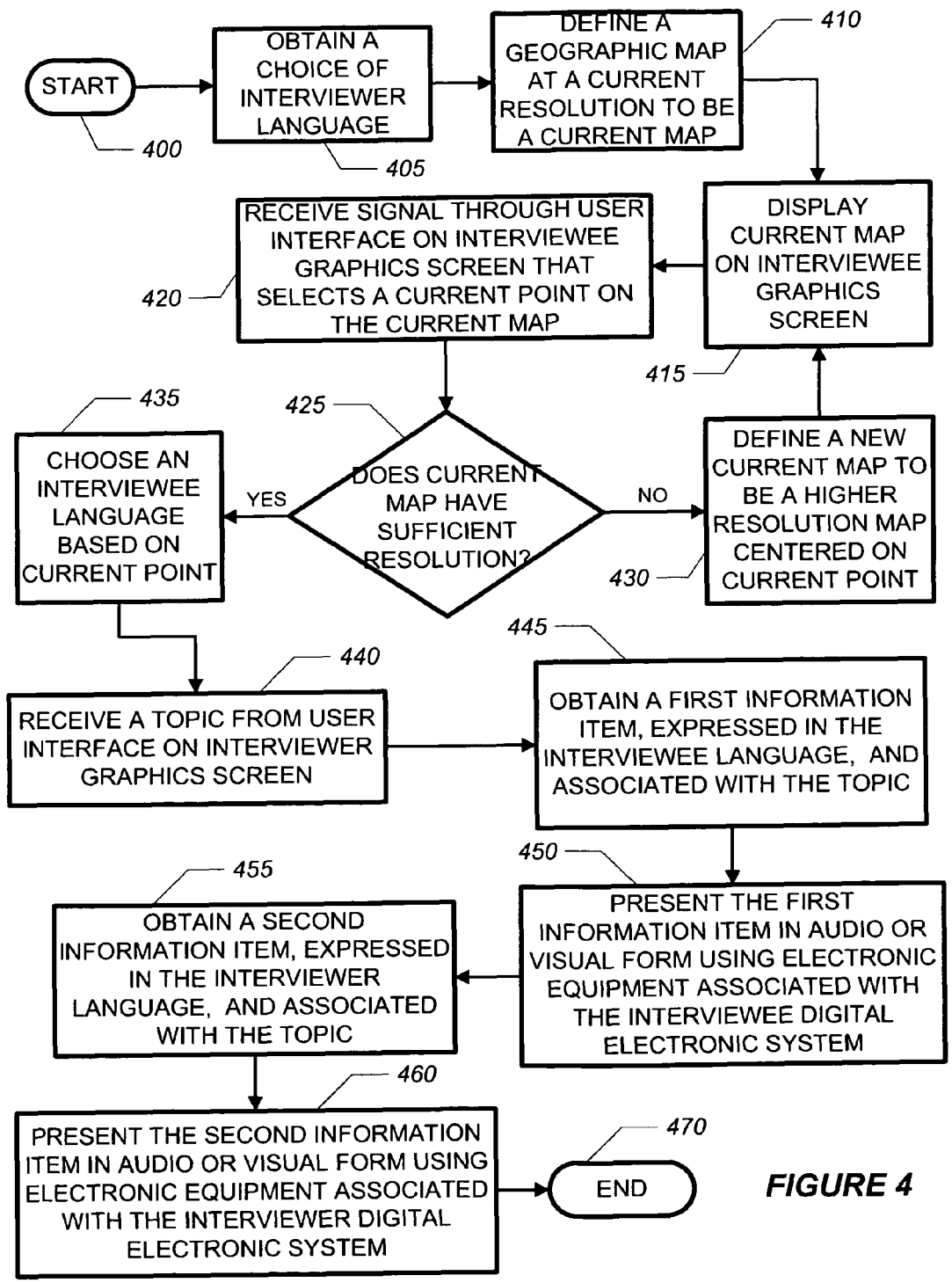
FIG. 4 flowchart illustrating an embodiment of the invention in which the language of the interviewee is determined by interaction of the interviewee with successively more highly resolved maps.

FIG. 4 is a flowchart illustrating an embodiment of the invention in which the language of the interviewee is determined by interaction of the interviewee with successively more highly resolved maps. After the start 400 of the method, a choice of interviewer language is obtained 405 by logic. For example, the interviewer might select his language from a GUI on an interviewer graphics screen 115. A current resolution is chosen, and a geographic map at that resolution is defined 410 to be a current map. For example, this initial map might be a map of the world at a sufficiently coarse resolution to fit on the screen 106.

The current map is displayed 415 on an interviewee graphics screen 145. A signal is received through a user interface on the interviewee graphics screen 145 that selects 420 a point on the current map. Logic then determines 425 whether the current map has sufficient resolution for a user to distinguish among regions shown by the current map where different languages are spoken. If the current map is still too coarse, a new current map is defined 430 to be a higher resolution map centered on the current point, and steps 415 through 425 are repeated using the new current map.

If the current map has sufficiently high resolution, then an interviewee language is chosen by associating the current point with a language spoken at the geographic location of the current point. The interviewee language, which is distinct from the interviewer language, is saved in storage 104.

A topic is received 440 from a user interface on an interviewer graphics screen 115. In some embodiments, this topic will be a topic selection chosen from a list of topics, usually a ranked list of topics. A first information item, associated with the topic and expressed in the interviewee language, will be obtained 445 by logic. For example, the first information item might be obtained by sending the topic to a server system 170 across a network, and receiving the first information item back from the server system 170. The first information item is then presented 450 in audio or visual form using electronic equipment associated with the interviewee system 140. For example, the first information might be a text item or an annotated digital image presented on the interviewee graphics screen 145, or it might be a question presented in audio form through an interviewee headset 165 or interviewee speaker 166 to the interviewee.

A second information item, associated with the topic and expressed in the interviewer language, is obtained 455 by logic. As in the example previously discussed, sending the topic to the server system 170 could result in the second information item being received from the server system 170. In some embodiments of the invention, the first information item is a translation of the second information item to the language of the interviewee. In other embodiments, the first and second information items have different meanings, such as when the second information item is a short summary of the first information item. Analogously to the first information item, the second information item is then presented 460 in audio or visual form using electronic equipment associated with the interviewer system 100. The method then ends 470.

Language Interpretation

Figure 5:
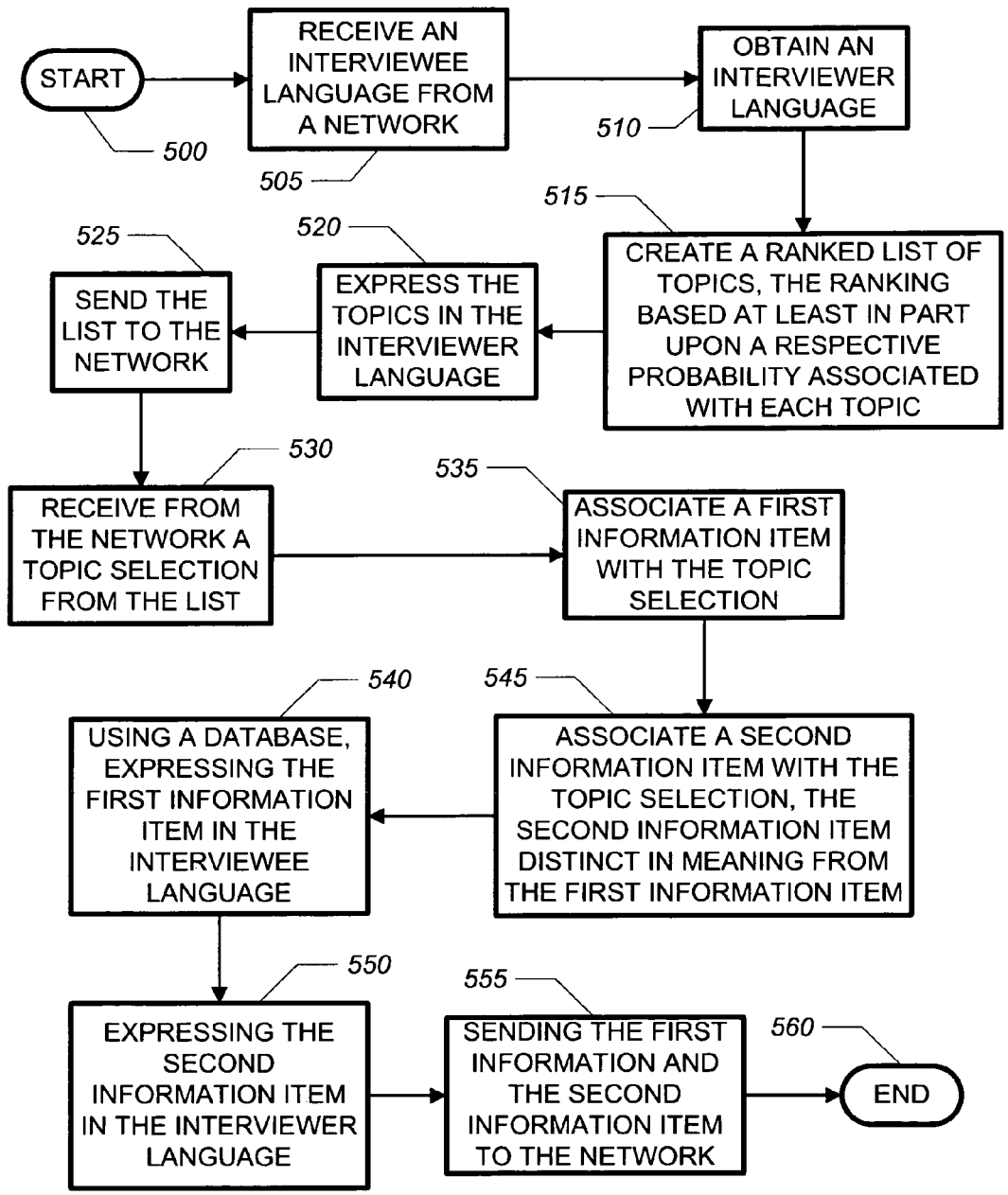
FIG. 5 is a flowchart illustrating an embodiment of language interpretation aspects the invention.

FIG. 5 is a flowchart illustrating language interpretation aspects of the invention. The embodiment shown in the flowchart assumes that language interpretation occurs on a server system 170 that communicates with the interviewer system 100 across a network 190. FIG. 5 gives a server-side perspective on the invention. Information will also be communicated from the server system 170 to the interviewee system 140, but as discussed previously, this communication might be either direct or through the interviewer system 100. The language interpolation might also occur on the interviewer system 100 or on the server system 170, with some modifications to the flowchart that will be discussed below.

After the method starts 500, a choice of interviewee language is obtained by logic. In the particular server-side embodiment shown, the interviewee language is received 505 from a network. The interviewee language could be sent through the network by the interviewer system 100 or the server system 170. In other embodiments, how the interviewee language is obtained might not involve a network.

Next, a choice of interviewer language is obtained 510 by logic. The interviewer language might be obtained in a variety of ways. For example, it might have a default or even fixed value; it might be obtained from a database based upon the identity of the interviewer; or it might be entered by the interviewer through a GUI on the interviewer system 100 and received by the server system 170 through a network 190.

A ranked list of topics is created 515, the ranking based at least in part upon a respective probability associated with each topic. The topics in the list are expressed 520 in the language of the interviewer. In the embodiment illustrated, the list is sent 525 by the server system 170 to the network 190.

In the next step 530, a topic selection from the list is received from the network 190. A first information item is associated 535 with the topic selection. Ordinarily, this is information associated with the topic that will be communicated to the interviewee in the interviewee's language. This information might be a question, an instruction, or a series of questions or instructions. A second information item is associated 540 with the topic selection. In the embodiment shown, the second information item has a distinct meaning from the first information. For example, the second information item might be a summary of the first information item. In other embodiments the two information items will have the same meaning.

Using a database, the first information item is expressed 545 in the interviewee language. The database might contain hundreds of possibilities for the interviewee language, rendering this process impossible to perform without the technology of the invention. The second information item 550 is expressed in the interviewer language. If there are more than one interviewer languages available, this step is also likely to involve retrieval from a database.

In the embodiment shown, the first and second information items are then sent 555 to the network. This step is not present in all embodiments of the invention. The method ends 560.

Multiple Interviewers

Figure 6:
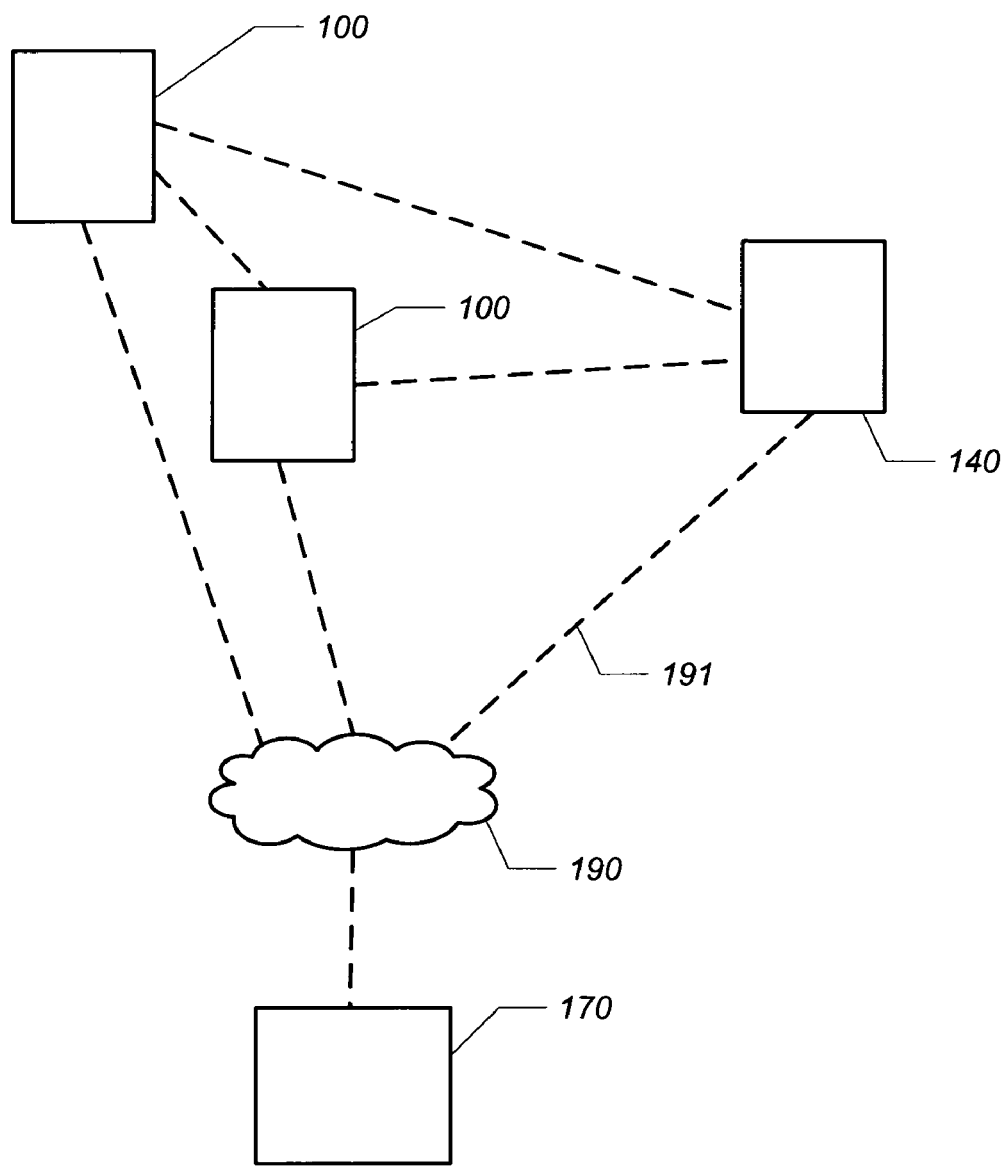
FIG. 6 is a schematic diagram illustrating an embodiment of the invention apparatus in which there are two interviewer systems.

FIG. 6 shows a configuration of the invention apparatus in which there are two interviewer systems 100 and an interviewee system 140, connected by communications links shown as dashed lines and typified by the one labeled 191. The interviewer systems 100 and the interviewee system 140 communicate with a server system 170 across a network 190. Communication among the interviewer systems 100 and interviewee system 140 might be implemented with wireless technology such as Bluetooth. Typical components of these systems are shown in FIG. 1. There might be two interviewer languages in the illustrated configuration. Whether the interviewers choose the same language or not, information displayed on each respective interviewer graphics screen 115 and transmitted through each respective interviewer sound equipment 130 will be expressed in the language of that interviewer. The interviewee might prefer a language different from both interviewers, or might share a common language with one of them. Information displayed on the interviewee graphics screen 145 and transmitted through the interviewee sound equipment 160 will be expressed in the language of the interviewee, regardless of which interviewer system 100 may have caused a transmission to be sent to the interviewee system 140. The invention encompasses embodiments wherein both interviewer systems 100 and the interviewee system 140 support all of the methods and functionality previously described in this document.

Multiple Interviewees

Figure 7:
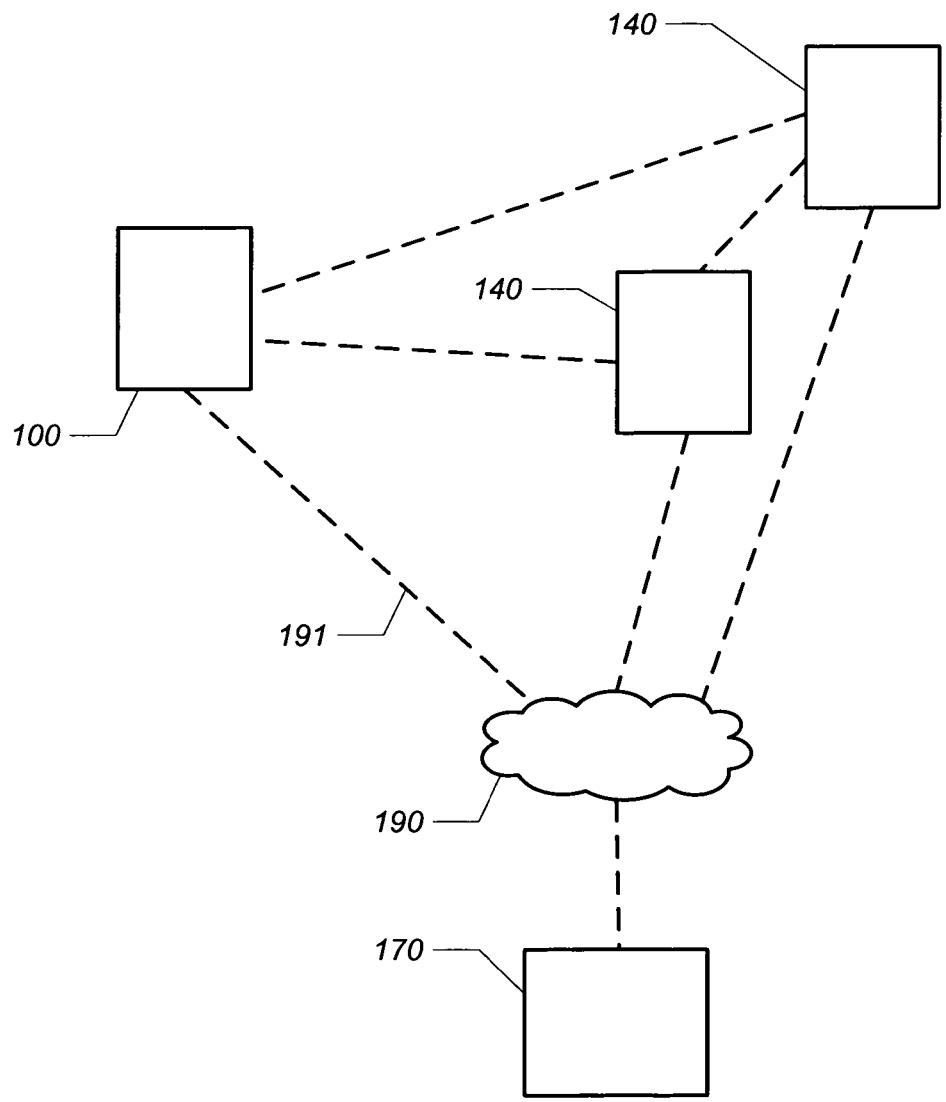
FIG. 7 is a schematic diagram illustrating an embodiment of the invention apparatus in which there are two interviewee systems.

FIG. 7 shows a configuration of the invention apparatus in which there are two interviewee systems 140 and an interviewer system 100, connected by communications links shown as dashed lines and typified by the one labeled 191. The interviewer system 100 and the interviewee systems 140 communicate with an server system 170 across a network 190. Communication among the interviewer system 100 and the interviewee systems 140 might be implemented with wireless technology such as Bluetooth. Typical components of these systems are shown in FIG. 1. There might be two interviewee languages in the illustrated configuration. Whether the interviewees choose the same language or not, information displayed on each respective interviewee graphics screen 145 and transmitted through each respective interviewee sound equipment 160 will be expressed in the language of that interviewee. The interviewer might or might not share a common language with one or the interviewees. Information displayed on the interviewer graphics screen 115 and transmitted through the interviewer sound equipment 130 will be expressed in the language of the interviewer. The invention encompasses embodiments wherein both interviewee systems 140 and interviewer system 100 support all of the methods and functionality previously described in this document.

Convertible Headset

A medical emergency is a good example of a situation in which a service provider needs a great deal of functionality both in capturing and utilizing measurements, and in communicating with a patient and potentially other people. An aspect of the invention is a headset that, in some embodiments, converts into a speaker system. In some embodiments, the headset is a data server, with interfaces both to sensors such as cameras and thermometers, and to one or more of the interviewer system, the interviewee system, and the server system.

Figure 8:
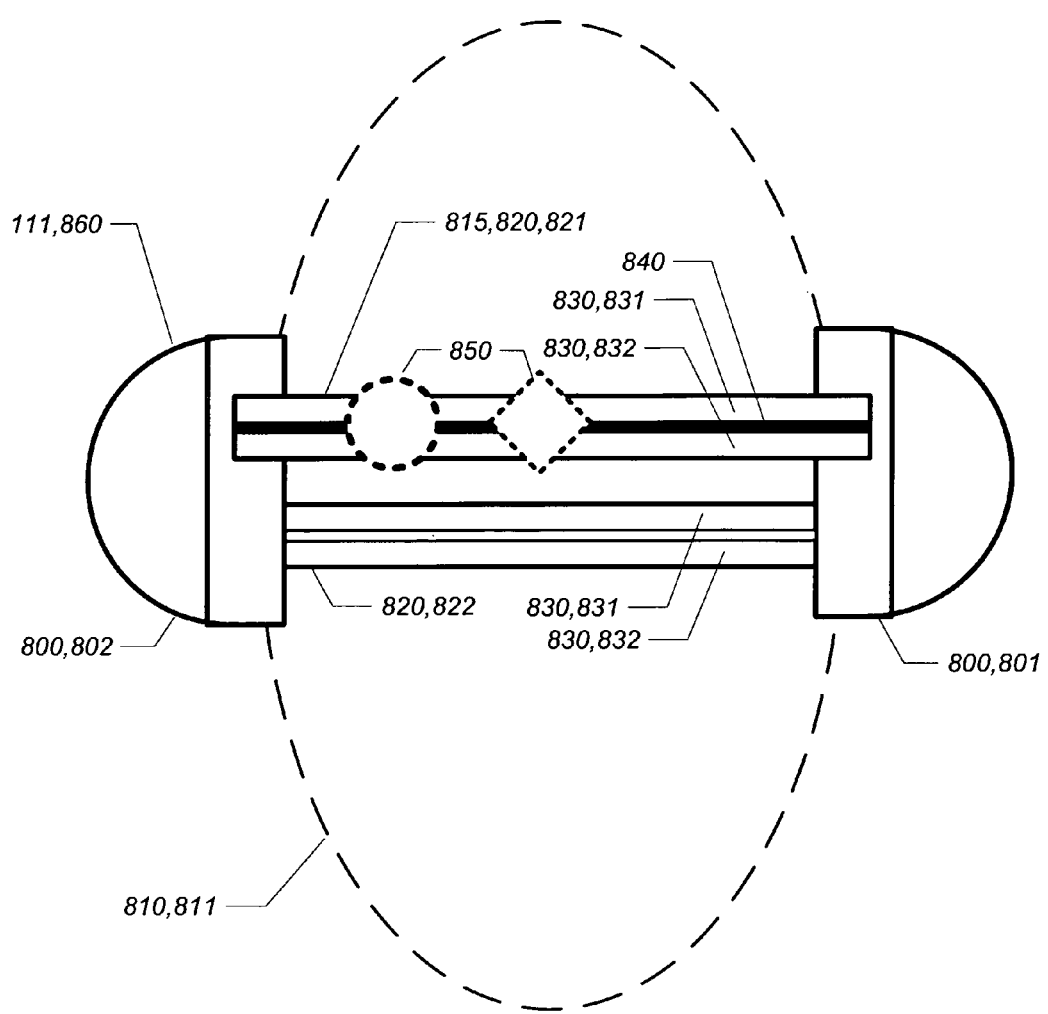
FIG. 8 is a front view illustrating a headset, in an embodiment of the invention, which converts into a speaker system and functions as a server for local sensors and for storage, in its head-mount configuration.

FIG. 8 is a front view of an embodiment of a headset 111 of the invention that includes both speaker functionality and storage server functionality. In this form, the headset 111 can function as either an interviewer headset 135 or an interviewee headset 165. The embodiment is shown in its head-mount configuration 860. Other embodiments contain one or the other of these types of functionality, but not both. The headset 111 contains a headband 815 and two ear cups 800, a left ear cup 801 and a right ear cup 802. Some embodiments of the invention only include a single ear cup 800. Audio information is transmitted to the user 811 through the ear cups 800. The head 810 of the user 811 is shown dashed in the figure.

In some embodiments of the invention, the headband 815 includes two sections or arches 820, a forehead arch 821 and a nape arch 822. The forehead arch 821 fits around the forehead of the user 811, and the nape arch 822 fits around the nape of the neck of the user 811, typically at the base of the skull. While the two arches 820 are both essentially in horizontal planes when the headset 111 is being worn, the two planes are usually offset vertically for a better fit, providing stability and comfort for the user 811. Also to give a better fit, the two arches 820 include two ribs 830, an upper rib 831 and a lower rib 832, typically fabricated from or covered with a soft material.

The embodiment shown in the figure is equipped with a pluggable component bus 840, which will be discussed in detail in connection with FIG. 24 through 26. Shown dashed, two pluggable components 850, are attached to the bus 840.

Figure 9:
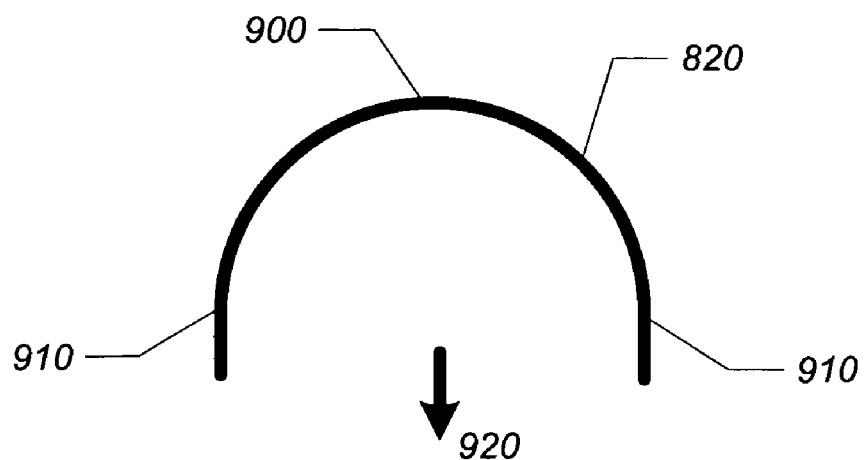
FIG. 9 is diagram used to define terminology relating to an arch.

FIG. 9 is included to define some terms relating to arch 820 geometry that will be used throughout the rest of this document. An arch 820 has a curved portion 900 and two tines 910. An arch 820 in mathematics has zero thickness and lies strictly in a plane. When, as in the present invention, an arch 820 is fabricated from tangible materials, the arch 820 lies essentially in a plane. The shape of the arch 820 defines an opening direction 920, indicated in the figure by an arrow.

Figure 10:
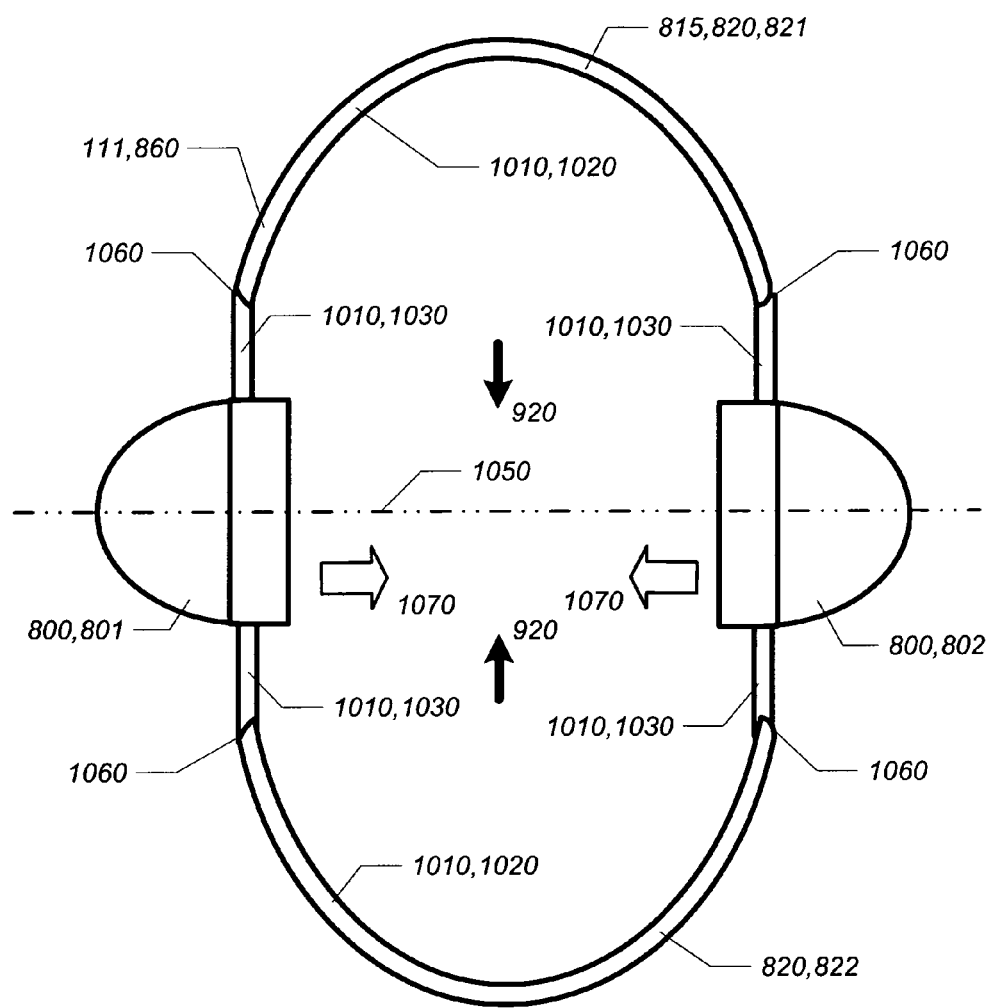
FIG. 10 is a top view illustrating the headset, in an embodiment of the invention, in its head-mount configuration.
Figure 11:
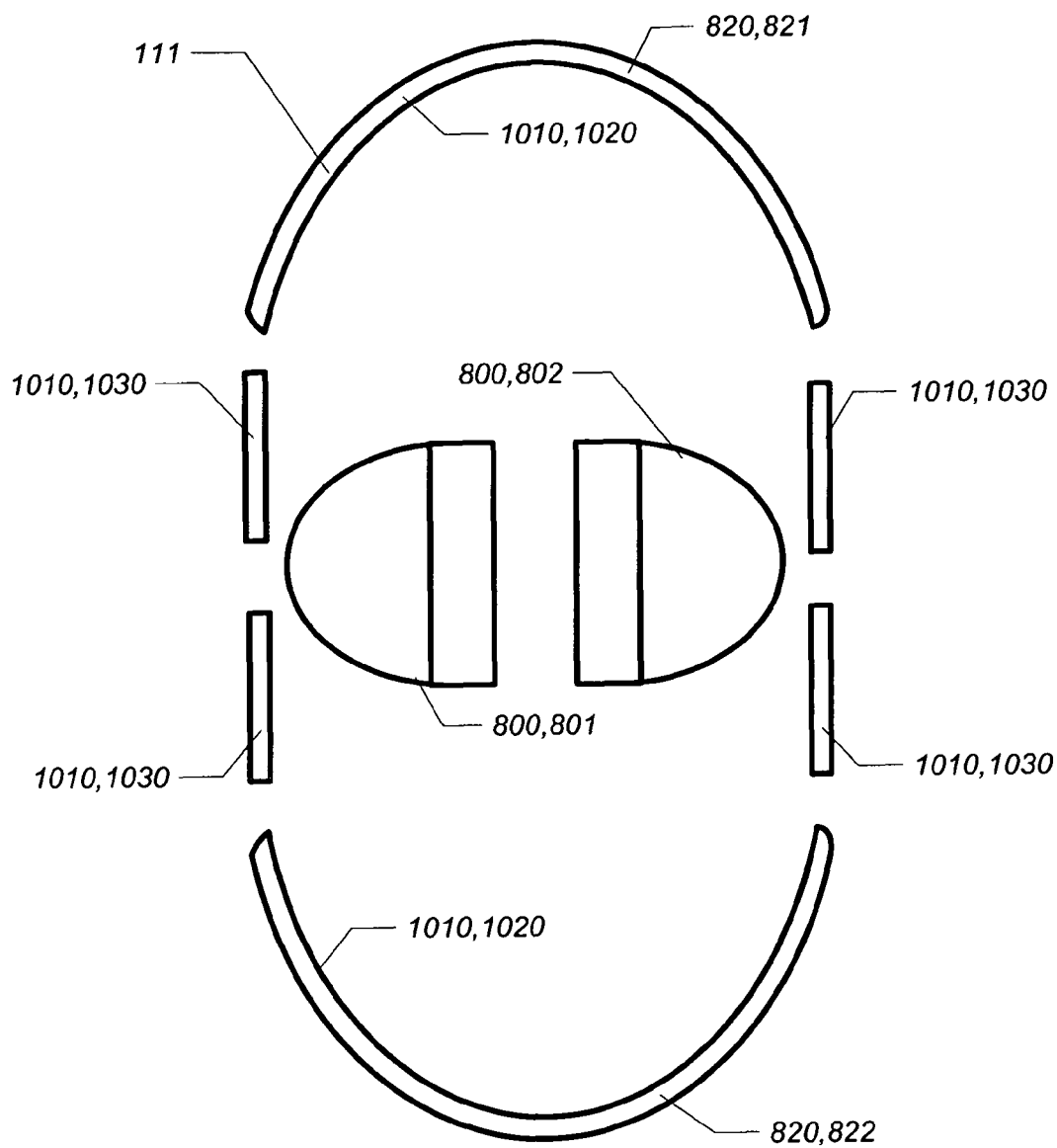
FIG. 11 is a top view of an embodiment of the invention, which illustrates a set of ribs, included in a headband, as separate items.

FIG. 10 is a top view of the headset 111 in some embodiments of the invention. The headset 111 is in its head-mount configuration 860 showing the headband 815 with its two headband arches 820. Transformation from this configuration into a speaker system requires a rotation of the forehead arch 821 and nape arch 822 relative to each other about the arch rotation axis 1050. In this embodiment, each arch 820 consists of three headband segments 1010, including a curved segment 1020 and two straight segments 1030. In other embodiments, there could be more or fewer headband segments 1010, or even a single one. The segments 1010 connect at joints 1060. As will be described below, the arch 820 expands at its joints 1060, permitting the headband 815 to be easily put on or taken off by the user 811. In the head-mount configuration 860, the ear cups 800 are oriented to primarily transmit sound inward in the transmission direction 1070 shown by the arrows in the figure. Note the transmission direction 1070 of each ear cup 800 is perpendicular to the opening direction 920 of each arch 820. FIG. 11 shows segments 1010 of the forehead arch 821 and the nape arch 822 separated at the joints 1060.

Figure 12:
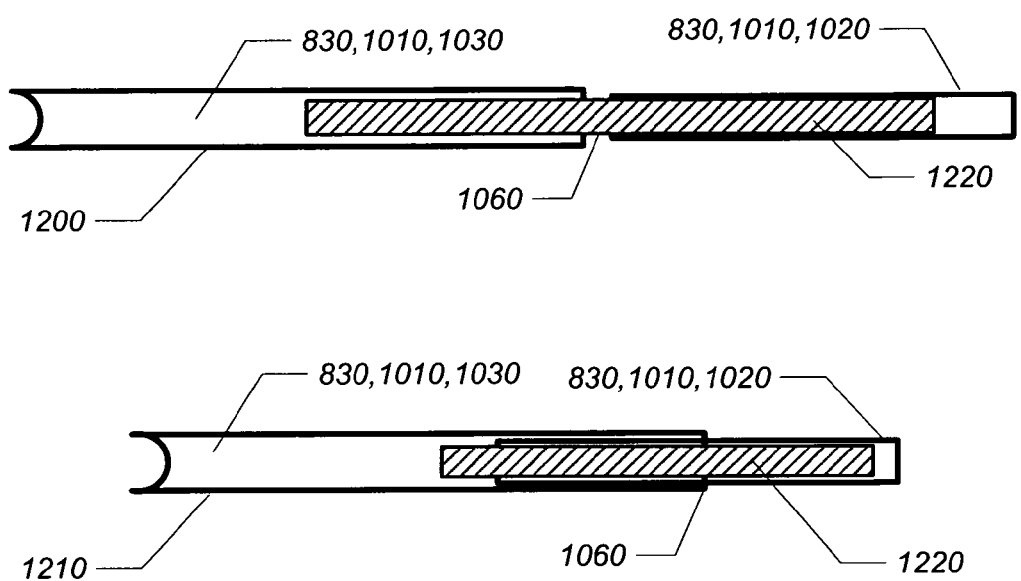
FIG. 12 is a cross-section, in an embodiment of the invention, illustrating expanded and contracted configurations of a headband rib joint.

FIG. 12 shows a single joint 1060 in a rib 830 of a headband arch 820. The upper drawing shows the expanded joint 1200; the lower figure shows the contracted joint 1210. The two segments 1010 of the rib 830 (arbitrarily oriented with a curved segment 1020 on the right of a straight segment 1030 are connected with an elastic connector 1220, which might be in the form of a stretchable band or a stretchable cord. The elastic connector 1220 allows the rib 830 to be expanded to make the headset 111 easy to put on or take off, while keeping the fit snug on the head 810. When the joint 1060 is contracted, one segment 1010 of the rib 830 fits inside the other, in a nesting or telescoping manner as shown. In this case, the elastic connector 1220 has a minimum length. When tension is applied to pull the segments 1010 apart, the elastic connector 1220 lengthens, and overall the length of the arch 820 increases. Ordinarily, to remove the headset 111, the user 811 will pull forward on the forehead arch 821 with one hand and backward with the nape arch 822 with the other, then upward with both hands.

Figure 13:
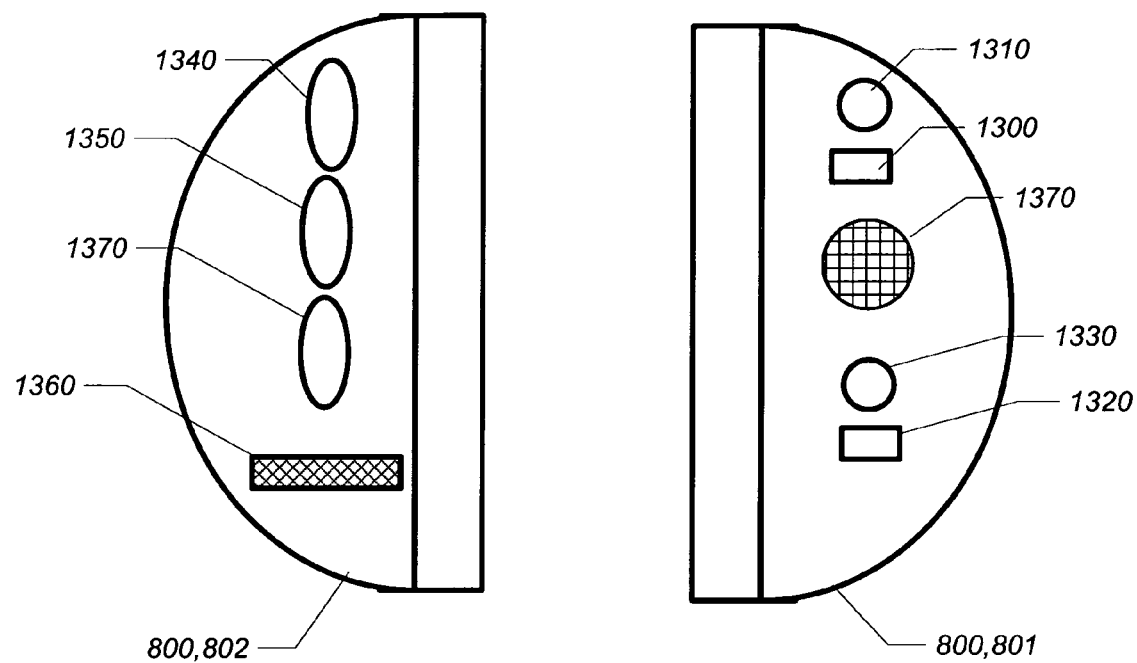
FIG. 13 is a side view of the headset ear cups in an embodiment of the invention illustrating typical human interface controls, an expansion slot, and wireless interfaces.

FIG. 13 shows controls and indicators, some or all of which may be included in various embodiments of the invention. These elements are shown on the ear cups 800, but one or more of them may alternatively be located on the headband 815. These include a power button 1300, enabling or disabling electrical functionality of the headset 111. A power indicator 1310 may indicate whether the headset 111 is powered on.

The headset 111 may have a mute button 1320 to disable sound from being broadcast electronically to the ear cups 800, the status of muting being indicated by a mute indicator 1330. In some embodiments, muting the ear cups 800 also removes a barrier 1370 to ambient sound entering the ear cups 800. This could be implemented, for example, with a motorized trap door over an opening such as that shown in the figure or with a manual slider. A paramedic, for example, might need to hear what is going on around him without taking the headset 111 off. Muting the electronically transmitted sound would accomplish this without powering down the headset 111. The ear cups 800 may have a fixed sound level, a sound level adjustment control in the headset 111, or a sound level adjustment control in some other system in communication with the headset 111, such as the interviewer system 100.

The headset 111 might have a PAN interface 1340, such as a Bluetooth interface. A PAN has limited range, which would be an advantage in a hospital context, and would be perfectly adequate for wireless communication between the headset 111 and the interviewer system 100 or the interviewee system 140 of the invention.

The headset 111 might also have a WAN interface 1350, such as one providing TCP/IP connectivity. This would allow, for example, wireless communication between the headset 111 and the server system 170. In some embodiments, the headset 111 is intimately involved with collecting and storing data from sensors, data that often will need to be recorded by the server system 170. The headset 111 might also have a LAN interface 1370, which might be useful in a business or home environment.

An expansion slot 1360 would be useful for a great variety of purposes, such as uploading data by wire, holding and powering a headlamp, or inserting a compact removal digital storage device. The expansion slot might be USB 2, FIREWIRE, or other technology.

Figure 14:
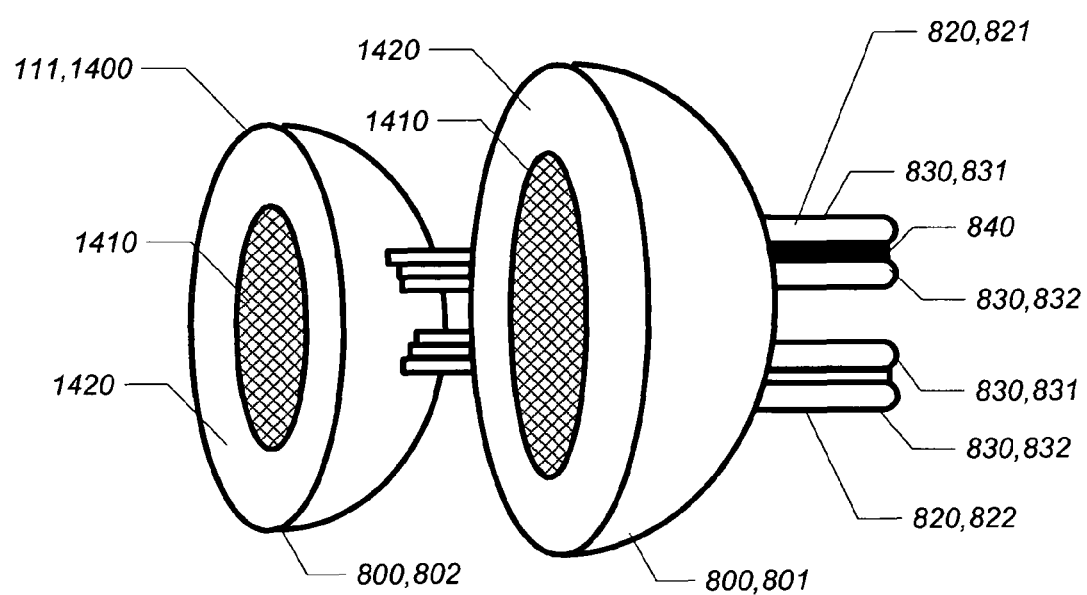
FIG. 14 is a perspective view of the headset of an embodiment of the invention in the broadcast configuration.
Figure 15:
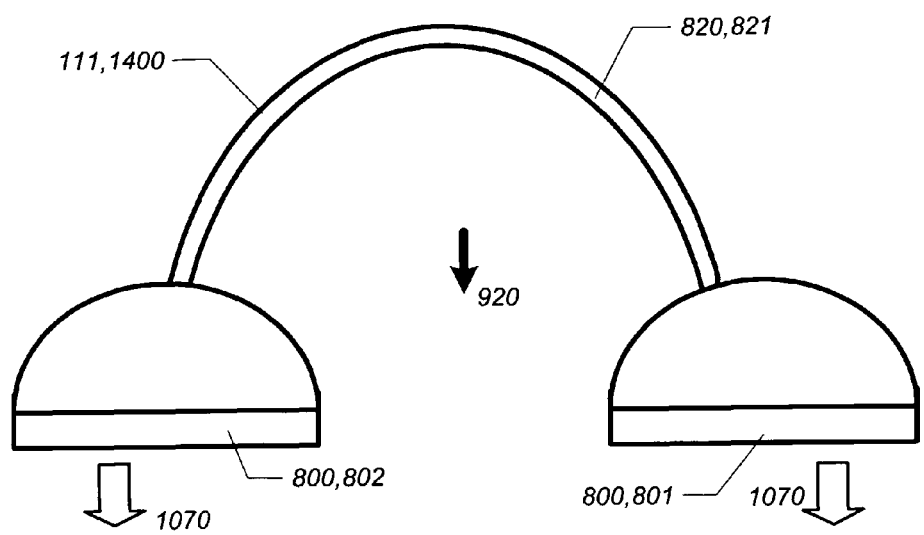
FIG. 15 is a top view of the headset of an embodiment of the invention in the broadcast configuration.
Figure 16:
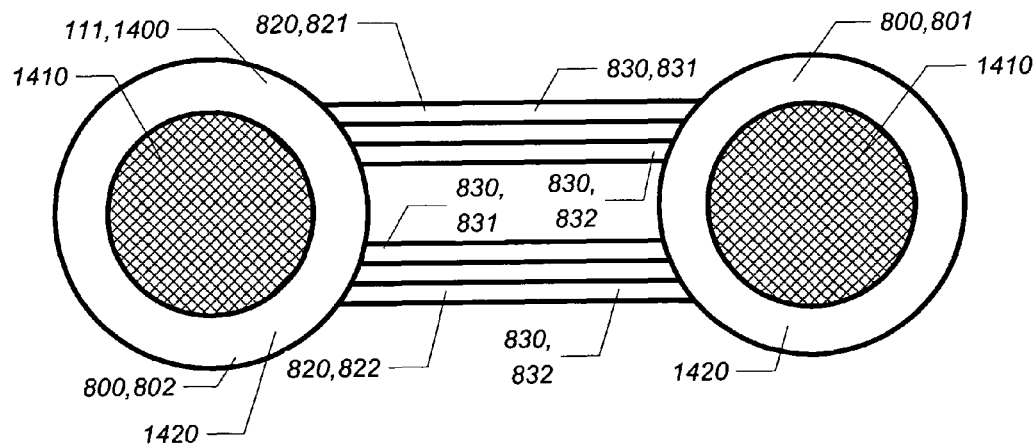
FIG. 16 is a front view of the headset of an embodiment of the invention in the broadcast configuration.

FIG. 14 is a perspective view of an embodiment of the invention when the headset 111 is in the broadcast configuration 1400; that is, when it is behaving as a speaker system. As shown, in this configuration, the ear cups 800 face in the same transmission direction 1070. The arches 820 are folded on top of each other, so that they both are oriented with the same opening direction 920. The sound-emitting surface 1410 of each ear cup 800 is shown. An ear cup 800 transmits audio information primarily outward from the ear cup 800 perpendicularly to the sound-emitting surface 1410. Surrounding the sound-emitting surface 1410 in most embodiments is a soft surface or earmuff 1420, standard in many prior art headsets, that both seals out external sound and makes the ear cup 800 fit comfortably against the ear of the user 811. FIG. 15 and FIG. 16 are top and front views of the headset 111 in the broadcast configuration 1400.

Figure 17:
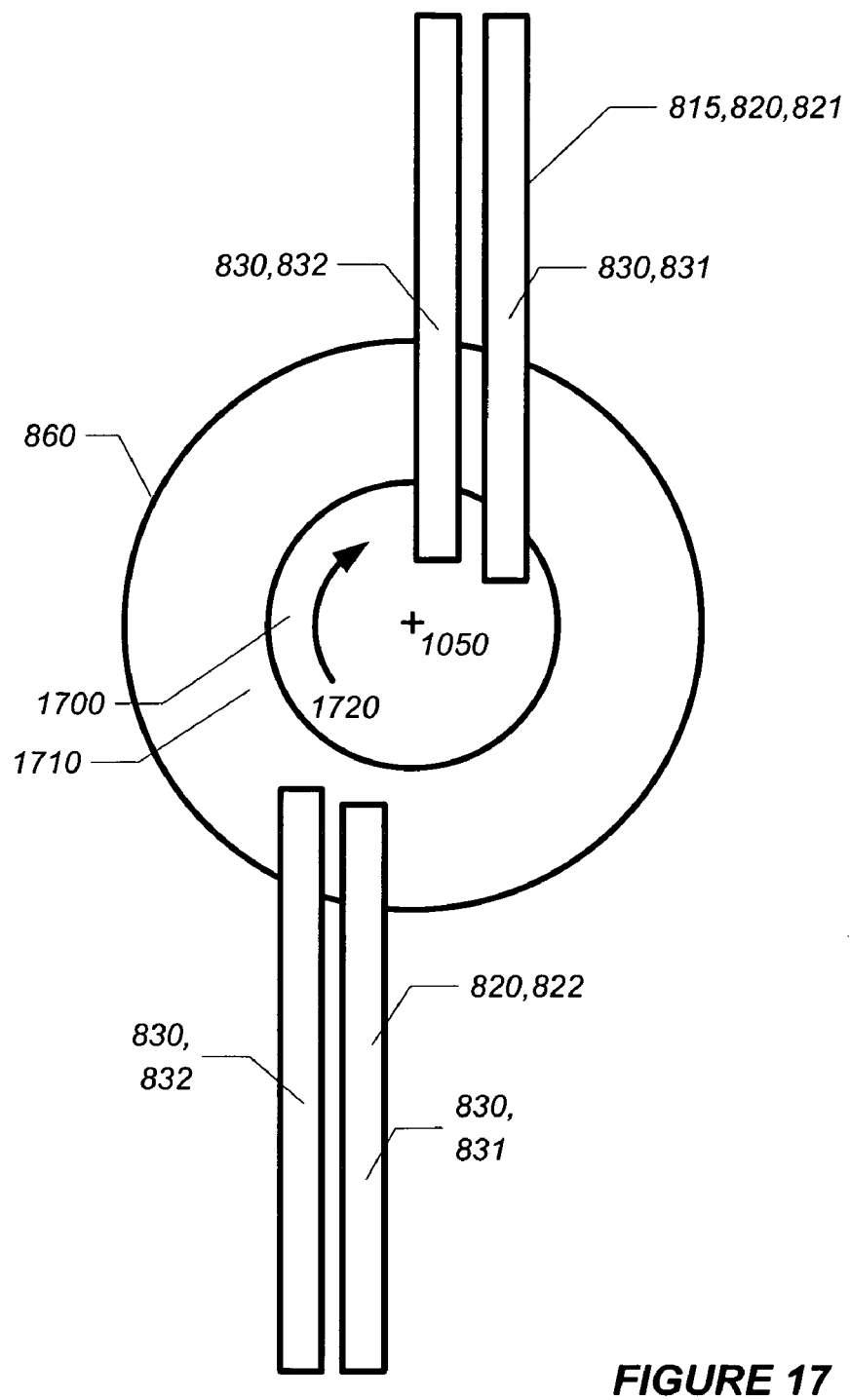
FIG. 17 is a side view, in an embodiment of the invention, of an ear cup and the forehead and nape headset arches, illustrating a mechanism for relative rotation of the arches in changing between the head-mount and the broadcast configurations.

To transform from the head-mount configuration 860 to the broadcast configuration 1400, the forehead arch 821 and the nape arch 822 of the headband 815 have to rotate relative to each other, and then the ear cups 800 have to turn outwards. In most embodiments, these steps are simply reversed to transform the headset 111 from the broadcast configuration 1400 to the head-mount configuration 860. FIGS. 17 through 21 give one particular structural implementation that enables the dual rotation. Many other configurations are possible that will not be shown, but which are within the scope of the invention. The inventive concept is independent of the particular implementation. FIG. 17 shows a structure that implements pivoting of one of the arches 820 around the arch rotation axis 1050. In this case, the nape arch 822 is configured to rotate toward the forehead arch 821, but the alternate configuration is possible within the scope of the invention; or, both arches 820 could rotate independently. The nape arch 822 is attached to an inner disc 1700 that is adapted to rotate in an inner ring rotation direction 1720 (and in the opposite direction to transform the headset 111 from the broadcast configuration 1400 to the head-mount configuration 860) within a fixed outer ring 1710 to which the forehead arch 821 is attached. The structure shown in the figure can be part of the ear cup 800 itself, or part of a connector that couples the arches 820 to the ear cups 800.

Figure 18:
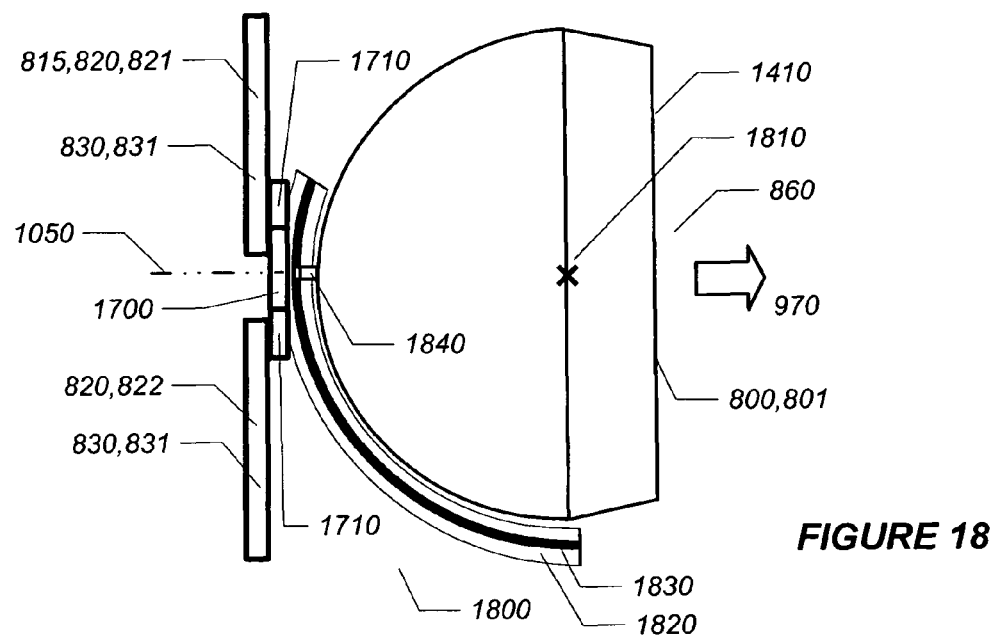
FIG. 18 is a side view, in an embodiment of the invention, of an ear cup and the forehead and nape arches in the head-mount position, illustrating a mechanism for relative rotation of an ear cup relative to the headband arches in changing between the head-mount and the broadcast configurations.

FIG. 18 is a view looking downward, illustrating an ear cup rotation mechanism 1800 for pivoting the ear cups 800 relative to the arches 820 of the headband 815. In the embodiment shown, the structure of FIG. 17 is integrated into a dual axis connector 1820 to which it is rigidly attached. Because of the complexity of the figure and because the ear cup 800 and dual axis connector 1820 are both in cross-section, nothing is hatched. The dual axis connector 1820 also includes a rigid portion that is a portion of a spherical shell, which appears circular in the cross-section of FIG. 18. This spherical portion includes a hollow track 1830 in which a guide tab 1840 attached to the rear surface (i.e., the surface opposite to the sound-emitting surface 1410) of the ear cup 800 can move. Given the geometry chosen in the embodiment of FIG. 17, the ear cup 800 is the left ear cup 801. To convert the headset 111 to the broadcast configuration 1400, the ear cup 800 shown would be rotated counter-clockwise about the ear cup rotation axis 1810. If a right ear cup 802 had been shown in the figure, it would be similarly constructed, and would rotate clockwise to change from head-mount configuration 860 to broadcast configuration 1400.

Figure 19:
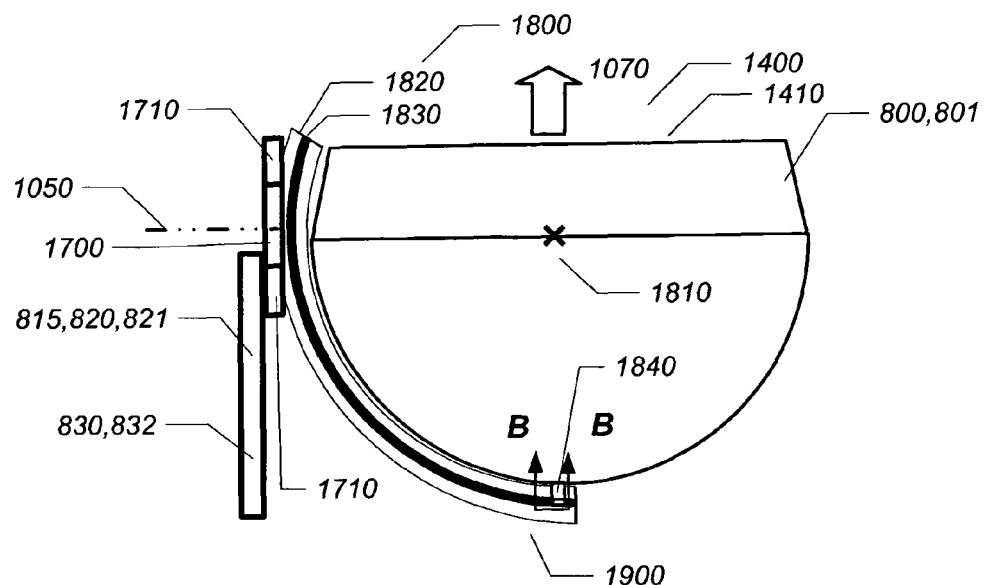
FIG. 19 is a side view, in an embodiment of the invention, of an ear cup and the forehead and nape arches in the broadcast position, illustrating a mechanism for relative rotation of an ear cup relative to the headband arches in changing between the head-mount and the broadcast configurations.
Figure 20:
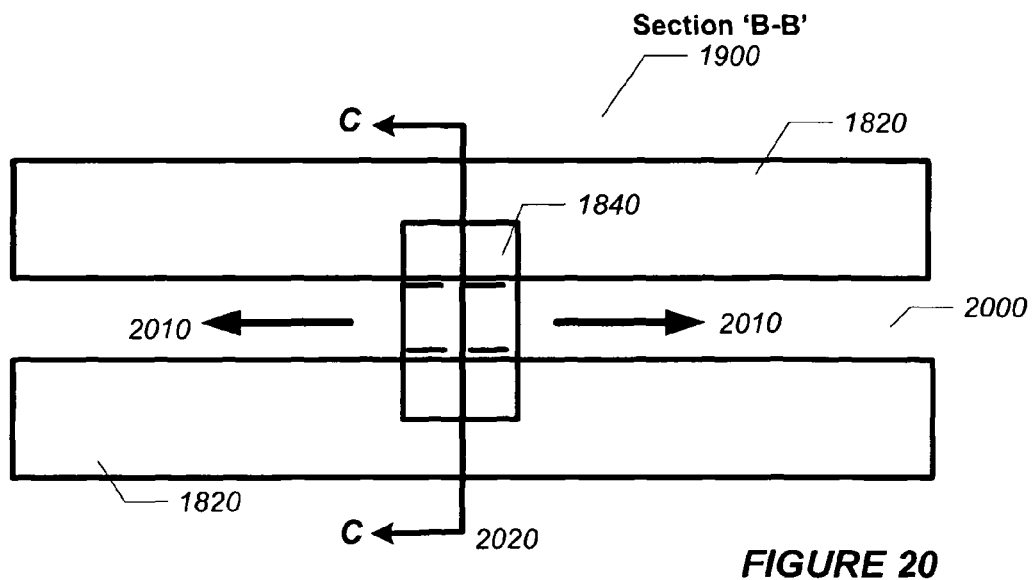
FIG. 20 is a section view illustrating a track for movement of a guide tab used in some embodiments to provide ear cup rotation relative to the headset arches.
Figure 21:
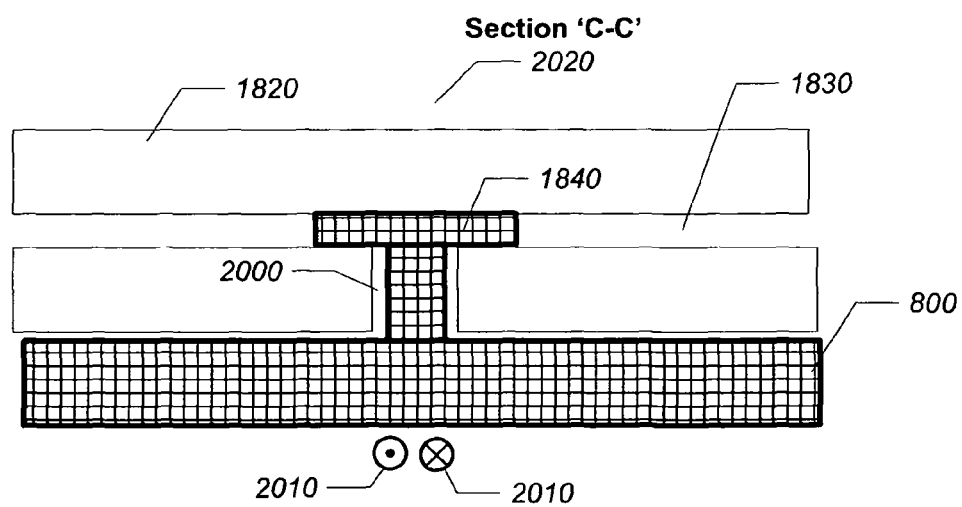
FIG. 21 is a cross-section side view through the guide tab that is used in some embodiments, showing the geometry of a channel through which it is adapted to move.

FIG. 19 is a figure analogous to FIG. 18 showing the same portion of the headset 111 in broadcast configuration 1400. Note that from this downward-looking perspective, the lower rib 832 of the forehead arch 821 obscures the other ribs 830. Illustrating the guide tab 1840 in the track 1830, section 'BB' 1900 is shown in FIG. 20. As seen in FIG. 21, the guide tab 1840 in this particular embodiment is shaped like the uppercase letter 'T'. The lower portion of the 'T' shape moves through a lower channel 2000 that was not shown in FIG. 17 nor FIG. 19, while the upper portion moves in the track 1830 shown in those figures. The guide movement directions 2010 are depicted by arrows.

FIG. 21 illustrates a section 'CC' 2020 through the guide tab 1840. The guide tab 1840 and a portion of the ear cup 800 to which it is connected are shown hatched. The other structure in the figure is a cut through a portion of the dual axis connector 1820.

When the headset 111 is in the head-mount configuration 860, the maximum amplitude of the ear cups 800 will be less than in the broadcast configuration 1400. This is enforced by the electronics using techniques that are well known in the art. Changing from one configuration to the other will automatically change the range of amplitudes available. If the headset 111 is powered on when the configuration is changed, the sound volume will automatically be changed proportionately lower relative to the maximum amplitude for that configuration. In some embodiments (not shown), the headset 111 includes a sound volume control.

Figure 22:
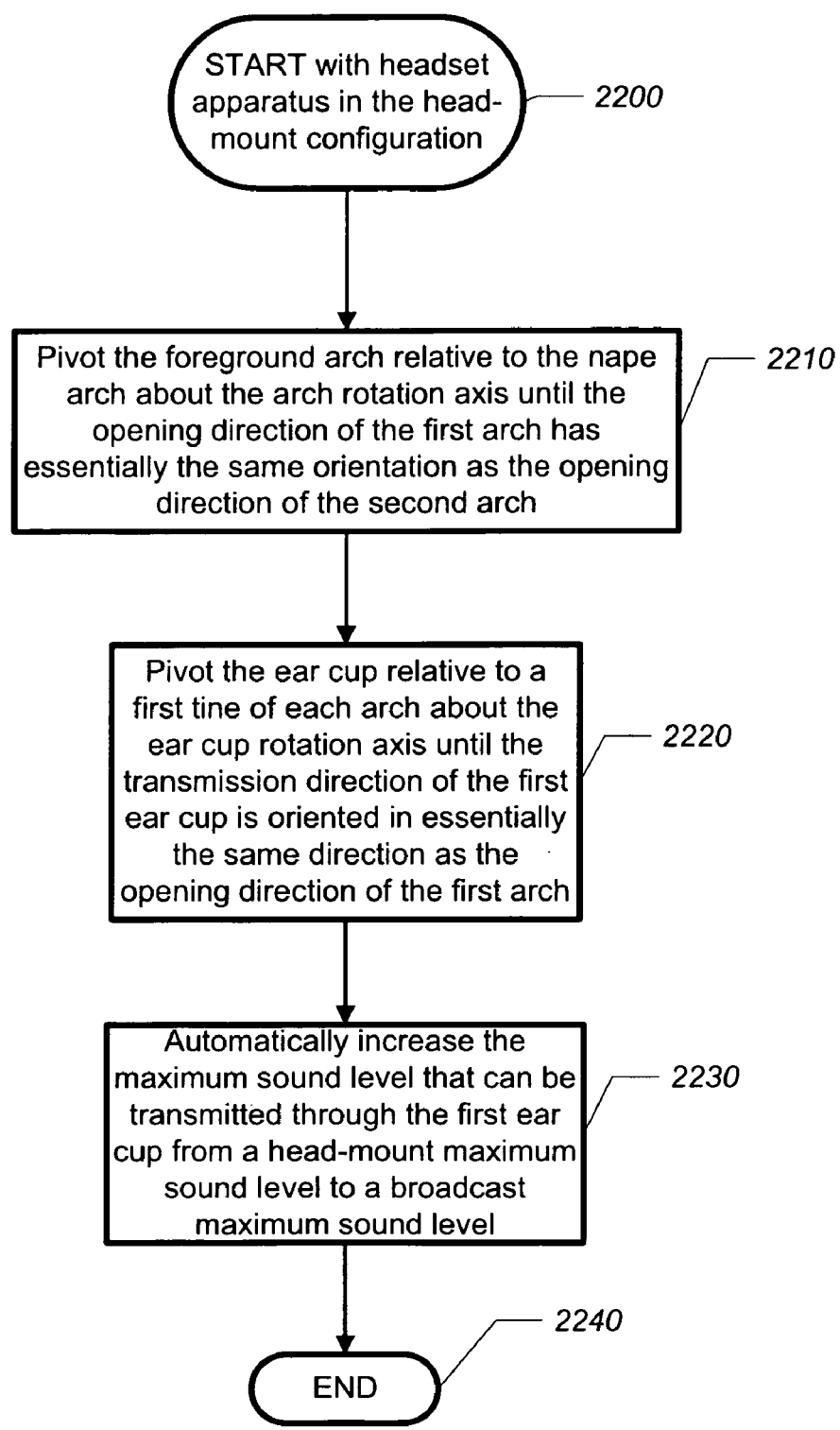
FIG. 22 is a flowchart illustrating, in an embodiment of the invention, a method for changing from the head-mount configuration of the headset to the broadcast configuration.

FIG. 22 illustrates an embodiment of a method for transforming the configuration of the headset 111 from the head-mount configuration 860 to the broadcast configuration 1400. The method is detailed for a single ear cup 800, but comprises a subset of the steps required for two ear cups 800. That case follows in the obvious way from the one presented in the figure. The method starts 2200 with the headset 111 in the head-mount configuration 860. The user 811 pivots 2210 the forehead arch 821 relative to the nape arch 822 about the arch rotation axis 1050 until the opening direction 920 of the first arch 820 has essentially the same orientation as the opening direction 920 of the second arch 820. The ear cup 800 is pivoted 2220 relative to a first tine 910 of each arch 820 about the ear cup rotation axis 1810 until the transmission direction 1070 of the ear cup 800 is oriented in essentially the same direction as the opening direction of the first arch 820. This second rotation might be done manually, or it might be coupled to the first rotation to perform automatically by a mechanical or electrical system. The maximum sound level that can be transmitted through the first ear cup is automatically increased 2230 from a head-mount maximum sound level to a broadcast maximum sound level.

Figure 23:
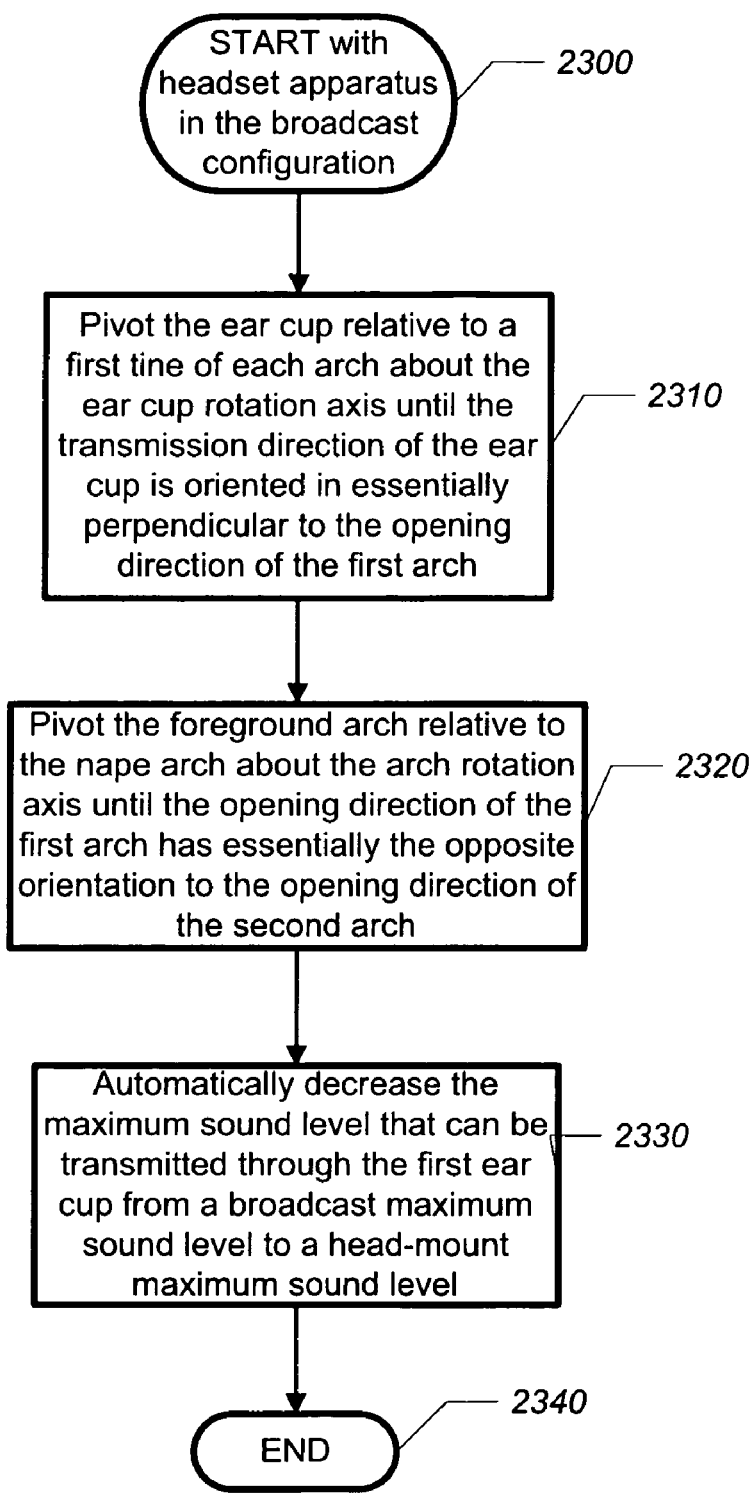
FIG. 23 is a flowchart illustrating, in an embodiment of the invention, a method for changing from the broadcast configuration of the headset to the head-mount configuration.

FIG. 23 illustrates an embodiment of a method for transforming the configuration of the headset 111 from the broadcast configuration 1400 to the head-mount configuration 860. The method starts 2300 with the headset 111 in the broadcast configuration 1400. The ear cup 800 is pivoted 2310 relative to a first tine 910 of each arch 820 about the ear cup rotation axis 1810 until the transmission direction 1070 of the ear cup 800 is oriented in essentially perpendicular to the opening direction of the first arch 820. The forehead arch 821 is pivoted relative to the nape arch 822 about the arch rotation axis 1050 until the opening direction 920 of the first arch 820 has essentially the opposite orientation to the opening direction 920 of the second arch 820. This second rotation might be done manually, or it might be coupled to the first rotation to perform automatically by a mechanical or electrical system. The maximum sound level that can be transmitted through the first ear cup 800 is automatically decreased FIG. 24 from a broadcast maximum sound level to a head-mount maximum sound level.

Figure 24:
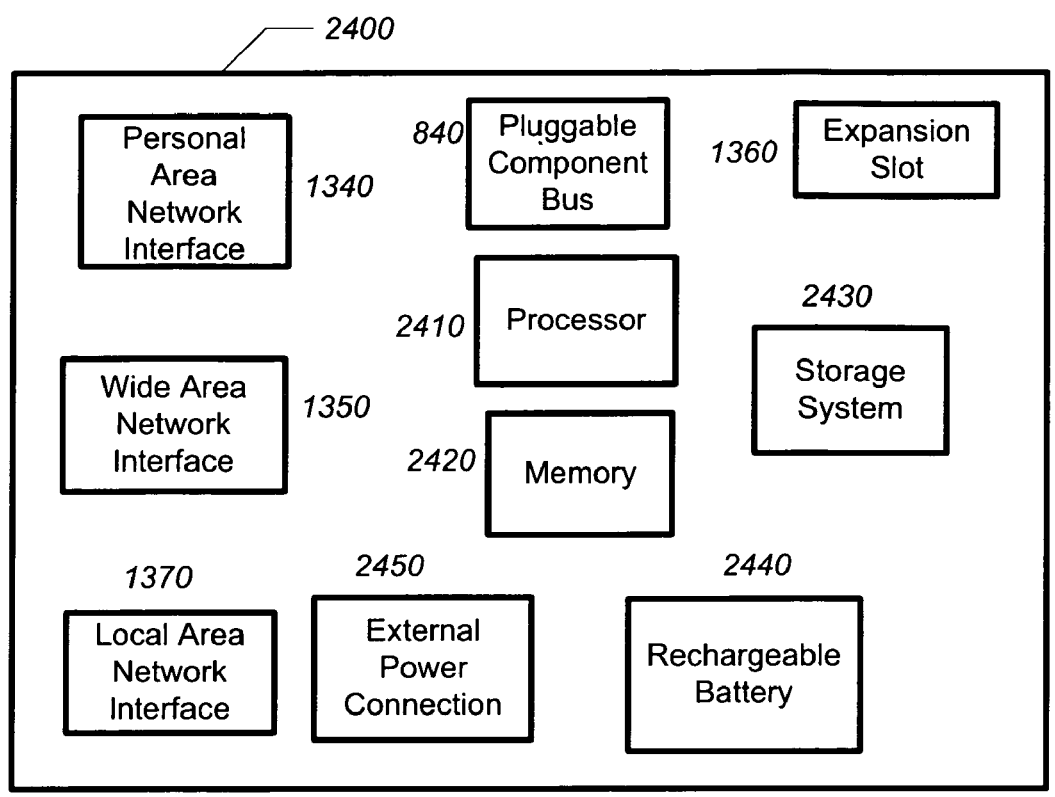
FIG. 24 is a schematic diagram illustrating the headset processing system in an embodiment of the invention.

FIG. 24 illustrates a headset processing system 2400. Some headset 111 embodiments might be convertible to a speaker system, others might have a processing system 2400 like the one shown in the figure, and others might have both types of functionality. The processing system 2400 has a power system, which might include a battery 2440 or a power connection 2450 to an external source. The particular processing system 2400 shown in the figure includes a battery 2440 that is rechargeable from an external power connection 2450. The processing system 2400 includes a processor 2410 and some form of memory 2420 for the processor to use to execute software instructions. The processor will operate under an operating system and will have communication access to the other components of the system. The processing system 2400 includes a storage system 2430, typically including a controller and a storage device. The storage system 2430 might be a hard drive, a DVD drive, or any other system adapted to storing information in digital form. The processing system 2400 will typically include software programs that are executable by the processor 2410. Such software programs, possibly augmented by hardware components, provide logic for functions to be performed by the processing system 2400, such as logic allowing the headset 111 to act as a storage server. The processing system 2400 will include one or more network interfaces. A network interface might be a PAN interface 1340, a WAN interface 1350, or a LAN interface 1370. These interfaces have already been described in connection with FIG. 13. In some headsets 111, the WAN interface 1350 might be a wireless server, providing other devices with access to the WAN. The processing system 2400 might also include an expansion slot 1360, which has also been discussed previously with FIG. 13. The processing system 2400 may also include a pluggable component bus 840, such as described in connection with FIG. 8.

With all the components shown in the figure, the headset 111 can serve as a data collection hub for the translation system or any other application. Instruments can be controlled by the processing system 2400 through the pluggable component bus 840; they can upload data for storage in the storage system 2430. The data can be transmitted to the interviewer system 100 or the interviewee system 140 on demand, or continuously while an instrument is operating. An industry standard expansion slot 1360, such as a USB port, can provide a great variety of capabilities. The WAN interface 1350 will allow the headset 111 to communicate with the server system 170.

Figure 25:
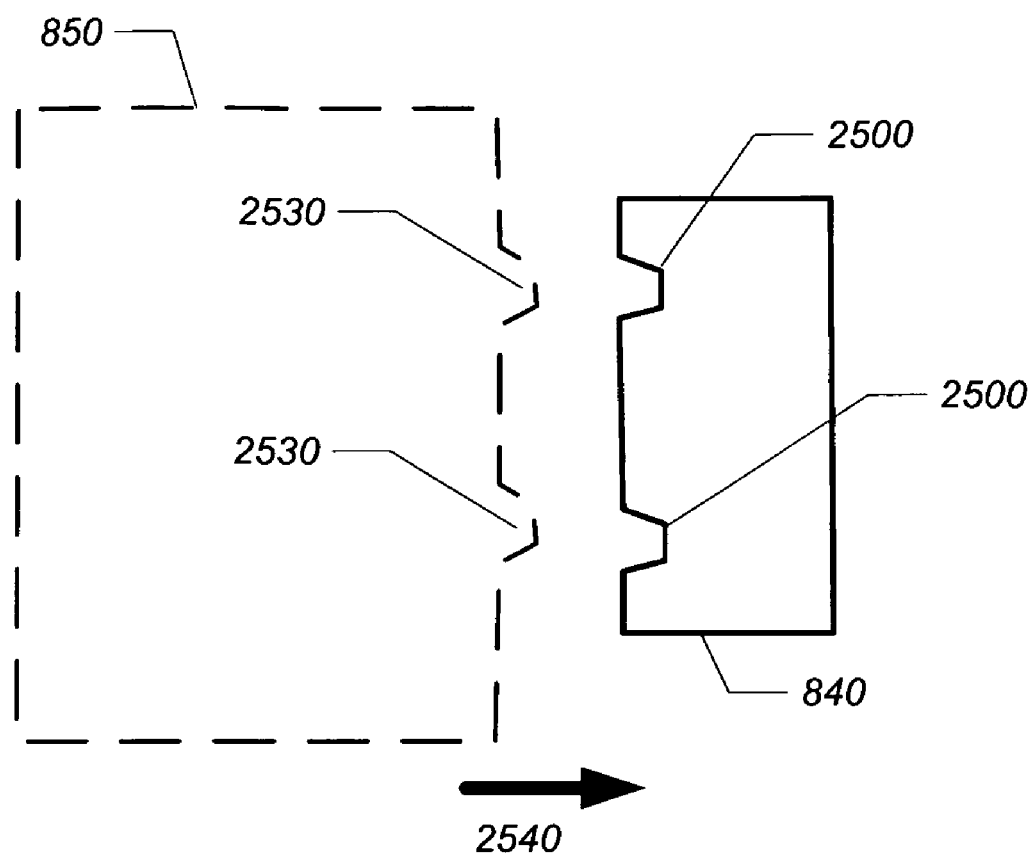
FIG. 25 is a side view of a headband bus strip in an embodiment of the invention illustrating coupling of a compatible pluggable component to the bus.

FIG. 25 shows an embodiment of the pluggable component bus 840 in a side cross-section view. The pluggable component bus 840 provides bus alignment features 2500 to facilitate positioning the pluggable components 850 easily and accurately on the bus 840 and a coupling mechanism to attach the pluggable component 850 to the bus 840. The figure depicts a particular embodiment in which the pluggable component bus 840 has female bus alignment features 2500 and a compatible pluggable component 850, with dashed outline, has matching male device alignment features 2530. An arrow 2540 shows how the pluggable component 850 will be moved to connect it to the pluggable component bus 840. In the particular embodiment shown, the pluggable component bus 840 would include a magnetic surface, and the pluggable component 850 would have a surface adapted to being magnetically attracted to that surface, or conversely. The pluggable component bus 840 furnishes power to pluggable components 850 and facilitates communication between the pluggable components 850, the processor 2410, and other components of the processing system 2400.

Figure 26:
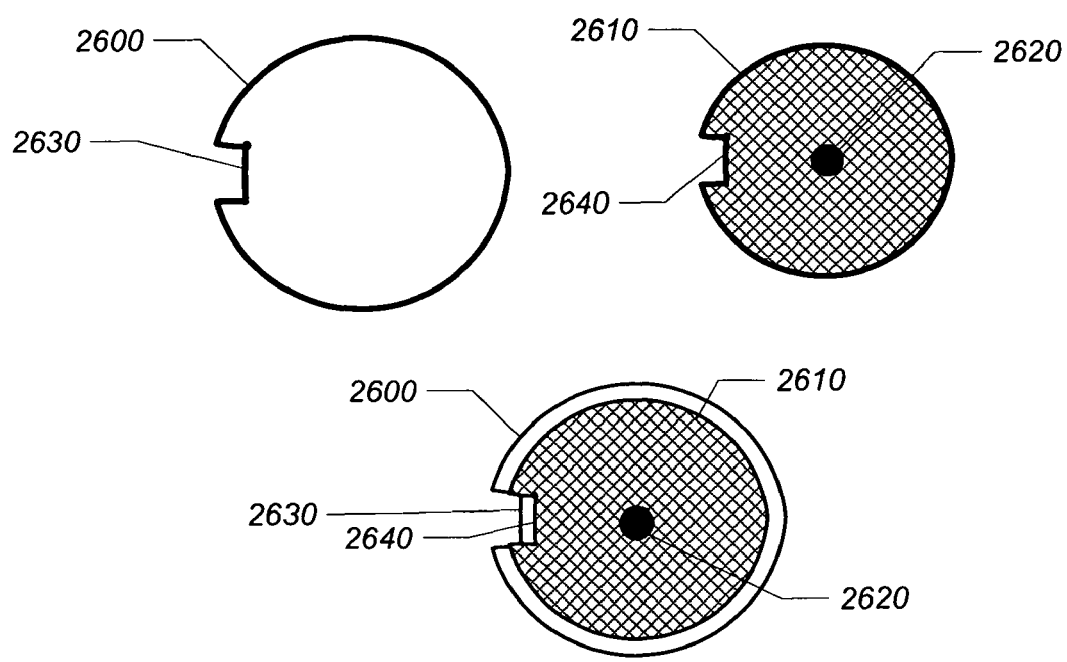
FIG. 26 is a set of cross-sectional views illustrating how power and control are passed between segments of a headband rib in an embodiment of the invention.

FIG. 26 illustrates a structure whereby power and communication can be transmitted between segments 1010 of an arch 820 of the headset 111. Two connecting segments 1010 would be approximately cylindrical in cross-section, and be enclosed by an outer ring 1710, such as that shown in cross-section, that contains a power surface 2630 made of conductive material contained in a channel. By appropriately sizing the diameters of the two outer rings 2600 and the sizes of their respective channels, the outer ring 1710 of one segment 1010 will fit inside of the outer ring 1710 of the other segment 1010, with their power surfaces 2630 in contact with each other. Each segment 1010 can contain an inner ring 2610 that encloses a wire chase tube 2620 for holding wires to pass between the segments. The inner ring 2610 can be slotted to fit inside the outer ring 1710 as shown in the lower part of the figure.

Figure 27:
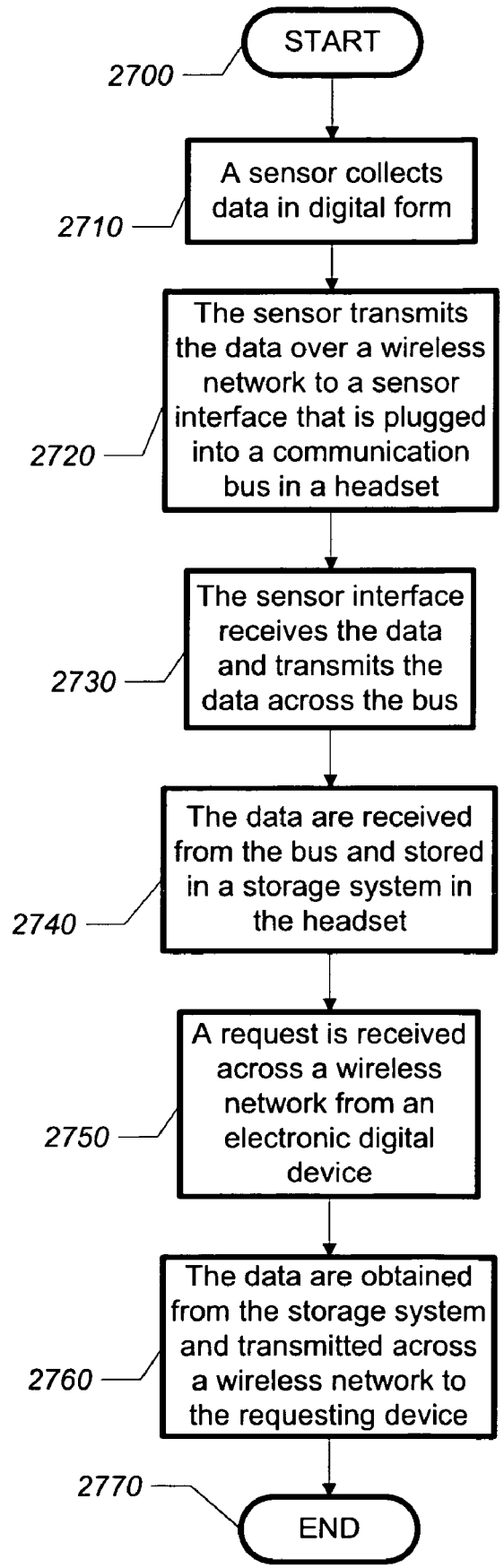
FIG. 27 is a flow chart illustrating the data sensing and storage server functionality of the invention.

FIG. 27 is a flow chart illustrating the data sensing and storage server functionality of the headset 111. At the start 2700 of the process, a sensor collects 2710 data in digital form. The sensor transmits 2720 the data to a sensor interface, which is a pluggable component 850 that is plugged into a communication bus 840 in a headset 111. The sensor interface receives the data over a wireless network (typically a PAN) and transmits 2730 the data across the bus 840. The data are received from the bus 840 and stored 2740 in a storage system 2430 in the headset 111. A request is received 2750 across a wireless network from an electronic digital device. The data are obtained from the storage system 2430 and transmitted 2760 across a wireless network to the requesting device, and the process ends 2770.

Conclusion

The present invention is not limited to all the above details, as modifications and variations may be made without departing from the intent or scope of the invention. Consequently, the invention should be limited only by the following claims and equivalent constructions.

What is claimed is:

1. An apparatus, comprising:
a) an interviewer digital electronic system, including an interviewer graphics screen;
b) an interviewee digital electronic system including interviewee sound equipment and an interviewee graphics screen adapted to electronic display of information in visual form;
c) logic adapted to causing a choice of an interviewee language to be saved to electronic storage;
d) logic on the interviewer digital electronic system adapted to presenting, on the interviewer graphics screen, a ranked list of topics, the topics being presented in an interviewer language, the ranking being determined at least in part upon a respective probability associated with each topic, and the interviewer language being distinct from the interviewee language;
e) logic on the interviewer digital electronic system adapted to receiving a topic selection from the ranked list; and
f) logic associated with the interviewee digital electronic system adapted to:
(i) receiving a first interviewee information item and a second interviewee information item associated with the topic selection, (ii)
transmitting the first interviewee information item in the interviewee language in audio form using the interviewee sound equipment, and
(iii) presenting the second interviewee information item in visual form using the interviewee graphics screen g) wherein the interviewee sound equipment includes a headset, adapted to transformation between a head-mount configuration and a broadcast configuration, the transformation involving a pivoting of an ear cup of the headset relative to a headband of the headset, wherein the headset is adapted to automatically limiting transmission of audio information to amplitudes not exceeding a head-mount maximum amplitude in the head-mount form and to amplitudes not exceeding a broadcast maximum amplitude, larger than the head-mount maximum amplitude, in the broadcast form, the logic associated with the interviewee digital electronic system being adapted to transmitting audio information to the headset in both the head-mount and the broadcast configurations.

2. The apparatus of claim 1, wherein the interviewer graphics screen and the interviewee graphics screen are included in the same device.

3. The apparatus of claim 1, further comprising:
g) logic associated with the interviewer digital electronic system adapted to: (i)
receiving an interviewer information item associated with the topic, and
(ii) transmitting the interviewer information item in audio form using interviewer sound equipment included in the interviewer digital electronic system.

4. The apparatus of claim 1, further comprising:
g) a data collection device adapted to collecting data in digital form and transmitting the data across a digital network; and
h) data server logic associated with the interviewer digital electronic system adapted to receiving the data from the data collection device across the digital network and causing the data to be saved in data server digital storage.

5. The apparatus of claim 4, wherein
the headset system includes the data server logic and the data server digital storage.

6. The apparatus of claim 5, wherein the headset system includes a processor adapted to causing data to be stored in the data server digital storage, a pluggable component bus adapted to communication between components plugged into the bus and the processor, and an data collection interface component, plugged into the bus, which is adapted to communicating across the digital network with the data collection device and across the bus with the processor, wherein the processor, the bus, and the data collection interface component provide data server logic.

7. A method, comprising:
a) obtaining in digital form by logic a choice of an interviewer language, and a choice of an interviewee language that is distinct from the interviewer language;
b) obtaining, by an interviewer digital electronic system, a ranked list of topics, the topics expressed in the interviewer language, the ranking being determined at least in part upon a respective probability associated with each topic;
c) displaying by logic the ranked list of topics on an interviewer graphics screen that is included in the interviewer digital electronic system;
d) obtaining by logic in the interviewer digital electronic system from a user interface on the interviewer graphics screen a topic selection from the ranked list;
e) obtaining by an interviewer digital electronic system a first interviewee information item expressed in the interviewee language, said first interviewee information item being associated with the topic selection;
f) transmitting the first interviewee information item in audio form using interviewee sound equipment associated with the interviewee digital electronic system
g) wherein the interviewee sound equipment includes a headset, adapted to transformation between a head-mount configuration and a broadcast configuration, the transformation involving apivoting of an ear cup of the headset relative to a headband of the headset, wherein the headset is adapted to automatically limiting transmission of audio information to amplitudes not exceeding a head-mount maximum amplitude in the head-mount form and to amplitudes not exceeding a broadcast maximum amplitude, larger than the head-mount maximum amplitude, in the broadcast form, and wherein the interviewee sound equipment in the step of transmitting the first interviewee information item is the headset in head-mount configuration, the method further comprising:
h) transmitting a second interviewee information item expressed in the interviewee language in audio form using the headset in broadcast configuration.

8. The method of claim 7, further comprising:
g) creating the ranked list of topics.

9. The method of claim 7, wherein the step of obtaining the ranked list includes receiving the ranked list from a network, and the step of obtaining a first interviewee information item expressed in the interviewee language includes receiving the first interviewee information item expressed in the interviewee language from a network, further comprising:
g) transmitting the topic selection electronically to a digital network.

10. The method of claim 7, wherein the ranking is further determined at least in part upon a respective expected loss associated with each topic.

11. The method of claim 7, wherein the respective probability associated with each topic is determined at least in part upon information stored in a database regarding a human interviewee.

12. The method of claim 7, further comprising:
g) receiving, by the interviewer digital electronic system from a digital network, an interviewer information item, said interviewer information item being expressed in the interviewer language and being associated with the topic selection; and
h) transmitting the interviewer information item by the interviewer digital electronic system in audio form using interviewer sound equipment associated with the interviewer digital electronic system.

13. The method of claim 12, wherein the interviewer information item is distinct in meaning from the first interviewee information item.

14. The method of claim 7, further comprising:
g) receiving, by the interviewee digital electronic system from a network, a second interviewee information item, said second interviewee information item being associated with the topic selection;
h) displaying the second interviewee information item on an interviewee graphics screen that is included in the interviewee digital electronic system.

15. The method of claim 14, wherein the interviewer graphics screen and the interviewee graphics screen are included in the same device.

16. The method of claim 14, wherein displaying the second interview information item includes displaying a three dimensional object on the interviewee graphics screen in a first configuration, further comprising:

i) after displaying the second interviewee information item, obtaining an interviewee signal from a graphical user interface associated with the interviewee graphics screen;

j) using logic on the interviewee electronic system, causing information relating to the interviewee signal to be sent to electronic storage; and k) using logic on the interviewee electronic system, displaying the three dimensional object in a translated or a rotated form relative to the first configuration.

17. A method, comprising:

a) obtaining in digital form a choice of an interviewer language;

b) obtaining in digital form a choice of an interviewee language that is distinct from the interviewer language including the following steps;
  (i) defining a geographic map at a current resolution to be a current map,
  (ii) displaying the current map on the interviewee graphics screen,
  (iii) receiving a signal through a graphical user interface on the interviewee graphics screen that selects a current point on the current map,
  (iv) determining by logic whether the current map has sufficient resolution for a human user to distinguish among regions, shown by the current map, where different languages are spoken, and
  (v) if the determining step indicates that the current map does not have sufficient resolution, then selecting by logic a higher resolution than the current resolution to be a new current resolution, and a map centered on the current point having the new current resolution to be the new current map, and repeating steps (ii) through (v); otherwise, choosing an interviewee language by associating the current point with a language spoken at the geographic location of the current point and causing the interviewee language to be stored in electronic digital storage;

c) receiving by logic a topic from a user interface on an interviewer digital electronic system;

d) on an interviewee digital electronic system, causing a first information item associated with the topic to be obtained from a database, said first information item being expressed in the interviewee language;

e) on the interviewer digital electronic system, causing a second information item associated with the topic to be obtained from a database, said second information item being expressed in the interviewer language and being distinct in meaning from the first information item;

f) presenting the first information item in audio form using an interviewee sound device or in visual form using an interviewee graphics screen;

g) presenting the second information item in audio form using an interviewer sound device or in visual form using an interviewer graphics screen.

18. The method of claim 17, wherein the interviewee graphics screen and the interviewer graphics screen are included in the same device.

* * * * *

UNITED STATES PATENT AND TRADEMARK OFFICE
CERTIFICATE OF CORRECTION

| | | |
|---|---|---|
| PATENT NO. | : 8,239,185 B2 | Page 1 of 1 |
| APPLICATION NO. | : 12/009229 | |
| DATED | : August 7, 2012 | |
| INVENTOR(S) | : Mat Johnson | |

It is certified that error appears in the above-identified patent and that said Letters Patent is hereby corrected as shown below:

Claim 6, Column 21, Line 43: please change -- an -- to -- a --

Signed and Sealed this
Twenty-seventh Day of November, 2012

David J. Kappos
*Director of the United States Patent and Trademark Office*